United States Patent
Mital et al.

(10) Patent No.: US 7,184,967 B1
(45) Date of Patent: Feb. 27, 2007

(54) SYSTEM AND METHOD UTILIZING A GRAPHICAL USER INTERFACE OF A BUSINESS PROCESS WORKFLOW SCHEDULING PROGRAM

(75) Inventors: Amit Mital, Kirkland, WA (US); Lucius Gregory Meredith, Seattle, WA (US); Marc Levy, Woodinville, WA (US); Brian C. Beckman, Newcastle, WA (US); Anthony D. Andrews, Sammamish, WA (US); Terry J. Myerson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 09/800,163

(22) Filed: Mar. 6, 2001

(51) Int. Cl.
*G05B 19/418* (2006.01)

(52) U.S. Cl. .......................................... 705/8
(58) Field of Classification Search ................ 705/8
See application file for complete search history.

(56) References Cited

U.S. PATENT DOCUMENTS

| | | | |
|---|---|---|---|
| 5,261,069 A | 11/1993 | Wilkinson et al. | |
| 5,524,241 A | 6/1996 | Ghoneimy et al. | |
| 5,576,946 A * | 11/1996 | Bender et al. | 700/17 |
| 5,581,691 A | 12/1996 | Hsu et al. | |
| 5,630,069 A | 5/1997 | Flores et al. | |
| 5,706,429 A | 1/1998 | Lai et al. | |
| 5,734,837 A * | 3/1998 | Flores et al. | 705/7 |
| 5,745,901 A * | 4/1998 | Entner et al. | 707/103 R |
| 5,774,661 A * | 6/1998 | Chatterjee et al. | 709/203 |
| 5,835,898 A * | 11/1998 | Borg et al. | 705/8 |
| 5,870,545 A * | 2/1999 | Davis et al. | 709/201 |
| 5,918,218 A | 6/1999 | Harris et al. | |
| 5,930,512 A * | 7/1999 | Boden et al. | 717/102 |
| 5,940,839 A | 8/1999 | Chen et al. | |

(Continued)

FOREIGN PATENT DOCUMENTS

WO    WO 98/47068    *    4/1998

OTHER PUBLICATIONS

Microsoft announces availability of BizTalk Server 2000 beta; Revolutionary new product will orchestrate the next generation of Internet-based business solutions, M2 Presswire, Aug. 15, 2000.*

(Continued)

*Primary Examiner*—Tariq Hafiz
*Assistant Examiner*—Scott L. Jarrett
(74) *Attorney, Agent, or Firm*—Amin, Turocy, & Calvin, LLP

(57) ABSTRACT

A graphical user interface (GUI) scheduler program is provided for modeling business workflow processes. The GUI scheduler program includes tools to allow a user to create a schedule for business workflow processes based on a set of rules defined by the GUI scheduler program. The rules facilitate deadlock not occurring within the schedule. The program provides tools for creating and defining message flows between entities. Additionally, the program provides tools that allow a user to define a binding between the schedule and components, such as COM components, script components, message queues and other workflow schedules. The scheduler program allows a user to define actions and group actions into transactions using simple GUI scheduling tools. The schedule can then be converted to executable code in a variety of forms such as XML, C, C+ and C++. The executable code can then be converted or interpreted for running the schedule.

35 Claims, 24 Drawing Sheets

U.S. PATENT DOCUMENTS

| | | | |
|---|---|---|---|
| 5,960,420 | A | 9/1999 | Leymann et al. |
| 5,999,911 | A * | 12/1999 | Berg et al. .................... 705/9 |
| 6,009,405 | A | 12/1999 | Leymann et al. |
| 6,073,109 | A * | 6/2000 | Flores et al. ................... 705/8 |
| 6,225,998 | B1 * | 5/2001 | Okita et al. ................. 715/853 |
| 6,233,537 | B1 * | 5/2001 | Gryphon et al. ............... 703/1 |
| 6,253,369 | B1 * | 6/2001 | Cloud et al. ................ 717/136 |
| 6,262,729 | B1 * | 7/2001 | Marcos et al. .............. 715/744 |
| 6,606,740 | B1 * | 8/2003 | Lynn et al. .................. 717/100 |
| 6,725,428 | B1 * | 4/2004 | Pareschi et al. ............ 715/530 |
| 6,968,503 | B1 * | 11/2005 | Chang et al. ............... 715/526 |
| 2001/0044738 | A1 * | 11/2001 | Elkin et al. .................... 705/8 |
| 2002/0035584 | A1 * | 3/2002 | Scheier et al. .............. 707/517 |
| 2004/0078373 | A1 * | 4/2004 | Ghoneimy et al. ........... 707/10 |

OTHER PUBLICATIONS

Gillmor, Steve, Talking About BizTalk, XML & Webservices Magazine, Fall 2000, Retreived Dec. 15, 2004 from: www.fawcette.com/archives/premier/mgznarch/xml/2000/04fal00/sg0004.asp.*

McKendrick, Steve, Microsoft Orchestrates Visual View of Biz Talk—Product Development ENT, Jun. 28, 2000.*

Microsoft Advances BizTalk Vision with Release of BizTalk Jumpstart Toolkit Version 2.0 PR Newswire, Feb. 14, 2000.*

Microsoft debuts BizTalk 2000 Technology; Preview demonstrates comprehensive solution for Internet application integration M2 Presswire, Apr. 12, 2000.*

Gordon, Phillip, A piece of the big picture for Microsoft InformationWeek, Nov. 1, 1999, p. 80.*

Mohr, Stephen, Introduction to Microsoft BizTalk Server Wrox Conferences, Las Vegas, Sep. 2000.*

Mohan, C., Recent Trends in Workflow Management Products, Standards and Research IBM Almaden Research Center, 1997.*

Shan, Ming-Chien et al., HP Workflow Research: Past, Present and Future Software Technology Laboratory, Aug. 1997.*

A Common Object Model Discussion Paper The Workflow Management Coalition, Jan. 1998.*

Workflow and Internet: Catalysts for Radical Change A WFMC White Paper The Workfow Management Coalition, Jun. 1998.*

Microsoft BizTalk Server 2000 Documentation—Help Files, Tutorial, Getting Started, Administration Microsoft Corporation, Copyright 1999-2000, Retreived Dec. 15, 2004 http://www.microsoft.com/biztalk/downloads/versions/default_2000.asp.*

BizTalk Initiative for Automating Business Process Integration White Paper—Web Pages Mar. 15, 2000, Retrieved from Archive.org Apr. 21, 2005.*

BizTalk Orchestration—A Technology for Orchestrating Business Interactions—White Paper Microsoft, Jun. 5, 2000.*

Dunn, Julie, Solutions Overview InfoWorld, Jan. 6, 1997, vol. 19, No. 1, pp. 56, 58, 60.*

Burden, Kevin, Taking the "techie" out of workflow design ComputerWorld, Sep. 15, 1997, vol. 31, No. 37. p. 94.*

Cox, Nancy, Passing The Baton With Four-Enterprise-Ready Workflow Management Product Network Computing, Oct. 15, 1997, vol. 8, No. 19, pp. 130-136.*

Angus, Jeff, Workflow system addresses middle ground InformationWeek, Dec. 15, 1997, pp. 118-119.*

Paul, Santanu et al., RainMan: A Workflow System for the Internet OOPSLA, 1997, Atlanta, USA.*

Kiely, Don, Microsoft Tackles the Workflow Beast InformationWeek, Nov. 15, 1999, pp. 203-204, 206.*

Sprott, David, Technology Audit I-Flow Butler Direct Limited, Jun. 1999.*

Mohan, C., Workflow Management in the Internet Age May 1999.*

Allison, Steve, Plexus FloWare: World Class Workflow BancTec, 2000.*

Zeng, Liangzhao et al., On Demand Business-to-Business Integration 9th International Conf. on Cooperative Info. Sys., vol. 2172, 2001.*

Forte Conductor Web Pages Forte, Jan. 1998, Retrieved from Archive.org Feb. 9, 2006.*

Teev.com Web Pages Teev, Feb. 2001, Retrieved from Archive.org Feb. 9, 2006.*

Teamware Flow 3.1 User's Guide Teamware, Apr. 2000.*

ActionWorkflow Enterprise Series 3.0 Process Builder User's Guide Action Technologies, Inc., 1996.*

Ott, Marcus, Conceptual Design and Implementation of a Graphical Workflow-Modeling Editor in the Context of Distributed Groupware-Databases, Master Thesis, University of Paderborn, May 1994.*

Using the WFT Development Environment Template Software 1998, Chapters 2, 3 and 6.*

Visio and Partners Announce Business Process Management Coalition PR Newswire, Apr. 29, 1996.*

Computron Software: Computron's workflow software wins Product of the Year Award Business Wire, Jan. 9, 1996.*

Schumacher, Robin, Visio Professional 4.5 DBMS, Oct. 1997, vol. 10, No. 11.*

Verve Introduces New Process Editor Tool; Graphical Workflow Tool Will Include Full Source Code Business Wire, Jun. 14, 1999.*

Bekker, Scott, Microsoft Rolls out a Workflow Toolset ENT, Oct. 20, 1999.*

Doherty, Robert, Visio Reshapes Company Thinking Information Week, Nov. 1, 1999, pp. 77, 80, 82.*

Lennox, Michael, Draw smart with Visio 2000 Technical Edition CADalyst, Dec. 1999, vol. 16, No. 12, pp. 46-49.*

Burnett et al., Visual Object Programming Concepts and Environments Manning Publishing Co., 1995, ISBN: 1-884777-01-5.*

Koulopoulus, Thomas, The Workflow Imperative John Wiley & Sons, Inc., 1995, ISBN: 0-471-28685-0.*

Bekker, Scott, Microsoft Rolls Out a Workflow Toolset—Grizzly workflow-design software ENT, Oct. 20, 1999.*

Onoda, Sen'ichi et al., Definition of Deadlock Patterns for Business Process Workflow Models Proceedings of 32nd Hawaii International Conf. On System Sciences, 1999.*

Verbeek, H.M.W. et al., Diagnosing Workflow Processes using Woflan 1999, Eidhoven University of Technology: Eidhoven.*

Wang, W. et al., E-process design and assurance using model checking Computer, vol. 33, No. 10, Oct. 2000, pp. 48-53.*

Karamanolis et al., Model Checking for Workflow Schemas EDOC'00, 2000, pp. 170-179.*

* cited by examiner

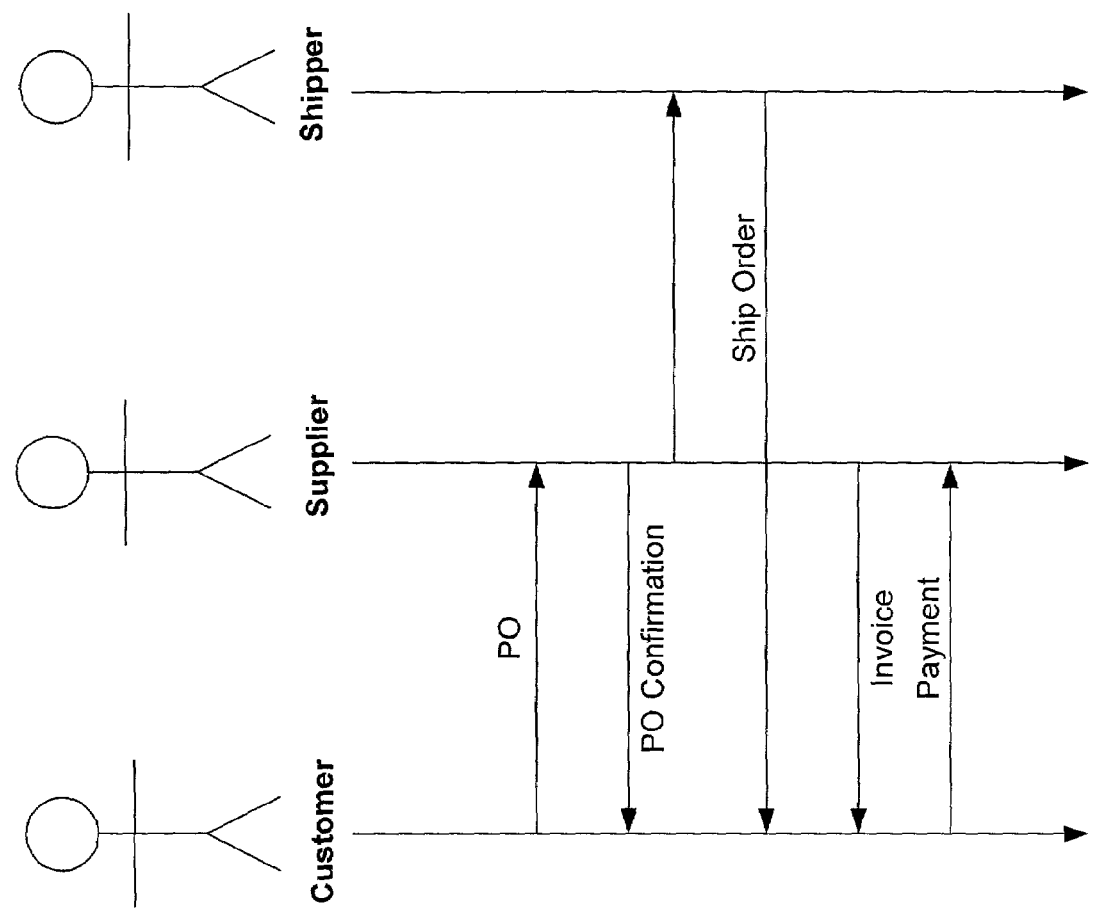

```
<connect>
    <partition>
        σ(δ(WTG₁,source(p₁,m₁)))
        <connect>
            <partition>
                σ(δ(WTG₂,source(p₂,m₂)))
                σ(δ(WTG₃,source(p₃,m₃)))
            </partition>
            <sequence>
                <task choice="all">
                    σ(sink(p₂',m₂'))
                    σ(sink(p₃',m₃'))
                </task>
                <zero/> <!-- This is the inner Continuation -->
            </sequence>
            <connectionList>
                ports p₂ and p₃ with ports p₂' and p₃'
            </connectionList>
        </connect>
    </partition>
    <sequence>
        <task choice="all">
            σ(sink(p₁',m₁'))
        </task>
        σ(WTGⱼ) <!-- Outer Continuation -->
    </sequence>
    <connectionList>
        port p₁ with port p₁'
    </connectionList>
</connect>
```

Fig. 23

| | | |
|---|---|---|
| SLANG | | |
| schedule | ::= | header? process? contextRef? |
| header | ::= | portList? messageList? contextList? |
| process | ::= | zero \| sequence \| switch \| map \| copy\| partition \| connect \| cut |
| portList | ::= | port* |
| messageList | ::= | message* |
| contextList | ::= | context* |
| zero | ::= | zero |
| sequence | ::= | genericAction* process? contextRef? |
| genericAction | ::= | silence \| action \| task \| call \| return \| release |
| silence | ::= | silence |
| action | ::= | source \| sink |
| source | ::= | portRef messageRef contextRef? |
| sink | ::= | portRef messageRef contextRerf? |
| task | ::= | action* contextRef? |
| call | ::= | schedRef portRef* messageRef* contextRef? |
| switch | ::= | branch* (default process) ? contextRef? |
| branch | ::= | case process |
| case | ::= | ruleRef msgRef msgRef |
| map | ::= | process assignmentList? contextRef? |
| assignmentList | ::= | asignment* |
| assignment | ::= | messageRef portRef |
| copy | ::= | process contextRef? |
| partition | ::= | process* contextRef? |
| connect | ::= | process process connectionList contextRef? |
| connectionList | ::= | connection* |
| connection | ::= | portRef portRef |
| cut | ::= | process process process contextRef? |

Fig. 24

SYSTEM AND METHOD UTILIZING A GRAPHICAL USER INTERFACE OF A BUSINESS PROCESS WORKFLOW SCHEDULING PROGRAM

TECHNICAL FIELD

The present invention relates to computer processes, and more particularly to a system and method for modeling business workflow processes employing a graphical user interface.

BACKGROUND OF THE INVENTION

Transaction processing systems have led the way for many ideas in distributed computing and fault-tolerant computing. For example, transaction processing systems have introduced distributed data for reliability, availability, and performance, and fault tolerant storage and processes, in addition to contributing to a client-server model and remote procedure call for distributed computation. Importantly, transaction processing introduced the concept of transaction ACID properties—atomicity, consistency, isolation and durability that has emerged as a unifying concept for distributed computations. Atomicity refers to a transaction's change to a state of an overall system happening all at once or not at all. Consistency refers to a transaction being a correct transformation of the system state and essentially means that the transaction is a correct program. Although transactions execute concurrently, isolation ensures that transactions appear to execute before or after another transaction because intermediate states of transactions are not visible to other transactions (e.g., locked during execution). Durability refers to once a transaction completes successfully (commits) its activities or its changes to the state become permanent and survive failures.

Many applications for workflow tools are internal to a business or organization. With the advent of networked computers and modems, computer systems at remote locations can now easily communicate with one another. This allows computer system workflow applications to be used between remote facilities within a company. Workflow applications can also be of particular utility in processing business transactions between different companies. Automating such processes can result in significant improvements in efficiency, not otherwise possible. However, this inter-company application of workflow technology requires co-operation of the companies and proper interfacing of the individual company's existing computer systems.

A fundamental concept of workflow analysis is that many business processes can be interpreted as a sequence of basic transactions called workflows. Workflows have a customer, a performer, and conditions of satisfaction. The customer and performer are roles that participants can take in workflows. In addition, workflows can have observers. In conventional business workflow systems, a transaction comprises a sequence of operations that change recoverable resources and data from one consistent state into another, and if a failure occurs before the transaction reaches normal termination those updates will be rolled back or undone. ACID transactions control concurrency by isolating atomic transitions against each other to create a serializable schedule by delaying updates until committing of transactions. This isolation limits granularity viewed by an observer to the size of the parent transactions until all child transactions commit within a parent transaction. Therefore, application specific programs cannot be invoked and monitoring of transactions by users cannot be performed based on any actions occurring within a transaction, until the transaction fails or commits.

The Unified Modeling Language (UML) defines a standard notation for representing flow charts for business workflow processes. However, the UML notation cannot be reduced to a programming language for employing complicated workflow processes. Current business workflow software systems provide scheduling software that requires binding within the scheduling to couple the schedule to real world applications and technologies. Conventional schedules require code to couple the components of the schedule to application program interface (API) objects and/or server objects for interfacing the schedule with systems within each business or department involved in the business process. These types of schedule software require sophisticated programmers to implement the software for a given business workflow model. Furthermore, these types of schedule software require modification of each schedule for different technologies.

Accordingly, there is an unmet need in the art for a system and/or method for providing a software tool for modeling a business workflow process that mitigates some of the aforementioned deficiencies associated with conventional software and modeling of business workflow processes.

SUMMARY OF THE INVENTION

The present invention relates to a graphical user interface (GUI) scheduler program for modeling business workflow processes. The GUI scheduler program includes tools to allow a user to create a schedule for business workflow processes based on a set of rules defined by the GUI scheduler program. The rules facilitate deadlock not occurring within the schedule. The program provides tools for creating and defining message flows between entities. Additionally, the program provides tools that allow a user to define a binding between the schedule and components, such as COM components, script components, message queues and other workflow schedules. The scheduler program allows a user to define actions and group actions into transactions using simple GUI scheduling tools. The schedule can then be converted to executable code in a variety of forms such as XML, C, C+ and C++. The executable code can then be converted or interpreted for running the schedule.

A user is provided with a GUI schedule interface, which allows the user to create a schedule on a first side of the GUI and to define bindings on the other side of the GUI. During creation of the schedule, the scheduler program prohibits the user from creating a schedule that will deadlock the schedule by checking correctness of the schedule flow. In creating the binding, the GUI schedule program provides prompts for specifying interfaces and methods of the components being bound. A data flow connection sheet is provided based on the schedule messages and the binding component interfaces and methods. The data flow of messages is then defined by simply connecting the message ports to binding component interfaces to facilitate proper data flow between entities. It is to be appreciated that the separate data flow sheet could be combined into the GUI scheduler interface or provided via a pop up screen after defining binding component interfaces and methods.

According to one aspect of the invention, a workflow scheduler graphical user interface program is provided. The workflow scheduler graphical user interface program comprises a first screen area adapted to allow a user to create a graphical representation of a business workflow process and a second screen area adapted to allow a user to bind the graphical representation of a business workflow process to at least one technological component.

Another aspect of the invention relates to a business process scheduling program. The business process scheduling program comprises a plurality of schedule tool components adapted to allow a user to create a representation of a business process schedule according to a set of predefined rules. The scheduling program also comprises a conversion component adapted to convert the schedule created by the user to executable code.

Yet another aspect of the invention relates to a computer readable medium having computer-executable instructions for performing a computer methodology. The methodology comprises the steps of displaying a screen having a first region adapted to allow a user to create a representation of a business workflow process. The screen also has a second region adapted to allow a user to bind the representation of the business workflow process to at least one technological component.

According to a further aspect of the invention, a system is provided. The system facilitates modeling of business processes comprised of a plurality of business operations being representable at a transaction level and an action level. The system comprises a computer-readable medium and a plurality of computer-executable components. The components comprise a graphical user interface and a plurality of modeling components accessible through the graphical user interface. The plurality of modeling components are adapted to allow a user to create a graphical representation of a business process and a binding of the business process to at least one technological component.

Another aspect of the invention relates to a graphical user interface program. The graphical user interface program comprises means for allowing a user to create a graphical representation of a business process and means for allowing a user to create a binding of the graphical representation of the business process to at least one technological component.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 6a illustrates a UML interaction diagram of a simplified purchase interaction in accordance with one aspect of the present invention.

FIG. 8a illustrates an example of a highlighted role in accordance with one aspect of the present invention.

FIG. 8b illustrates an example of a non-highlighted role in accordance with one aspect of the present invention.

FIG. 8d illustrates an example of a role before association in accordance with one aspect of the present invention.

FIG. 8e illustrates an example of a role after association in accordance with one aspect of the present invention.

FIG. 8f illustrates an example of an illegal role association in accordance with one aspect of the present invention.

FIG. 23 illustrates an example of a conversion of the simple workflow process of FIG. 22 into XML constructs in accordance with one aspect of the present invention.

FIG. 24 illustrates a modeling scheduling language syntax in extended Backus-Naur Form Notation (EBNF) for mapping the (GUI) scheduling components to a program language in accordance with one aspect of the present invention.

DETAILED DESCRIPTION OF THE INVENTION

Figure 1:
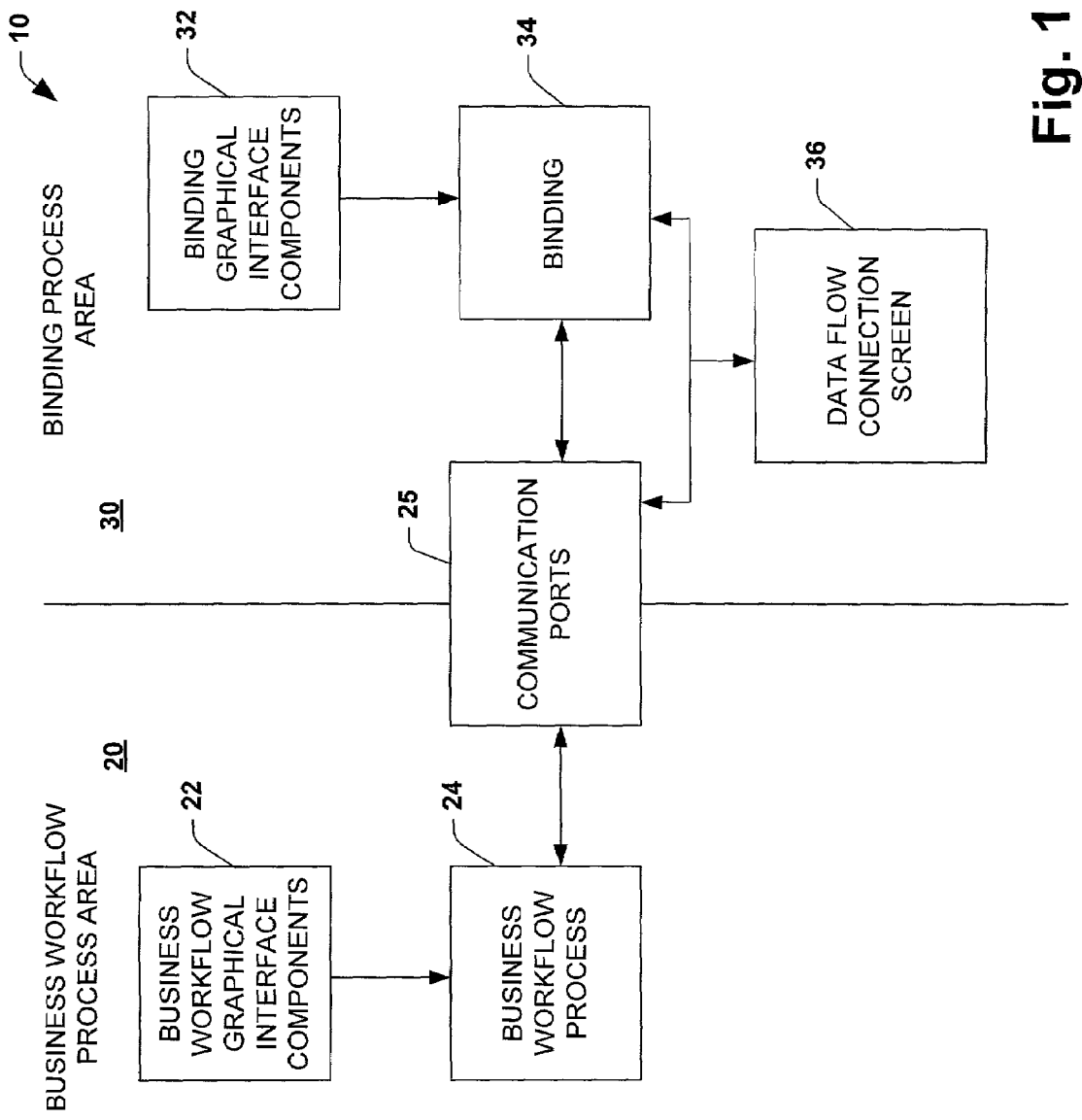
FIG. 1 illustrates a block diagram of a graphical user interface scheduler program in accordance with one aspect of the present invention.

The present invention is now described with reference to the drawings, wherein like reference numerals are used to refer to like elements throughout. The present invention is described with reference to a system and method for modeling a business workflow process employing a graphical user interface (GUI) scheduler program. The GUI scheduler program provides tools for creating a schedule for business workflow process. The tools include constraints defined by a set of rules. The rules mitigate deadlock from occurring within the schedule. The tools allow binding of the schedule to technological components, such as COM components, Script components, Message Queue components and other schedules. The GUI schedule software allows a user to define actions and group actions into transactions. The schedule can then be converted to a programming language for execution.

FIG. 1 illustrates a block diagram of the components in a GUI scheduling software program 10. The GUI scheduling software program 10 includes a business workflow process area 20 and a binding process area 30. The business workflow process area 20 includes a business workflow process 24 created using a plurality of business workflow graphical interface components 22. The binding process area 20 includes a binding process 34 created using a plurality of binding graphical interface components 32. The components in the business workflow process 24 are coupled to the components in the binding process 34 by a plurality of communication ports 25. A data flow connection screen 36 is provided that illustrates the data flow connections associated with variables of binding components and the communications ports allowing a user to view the message flows of the business process.

Figure 2:
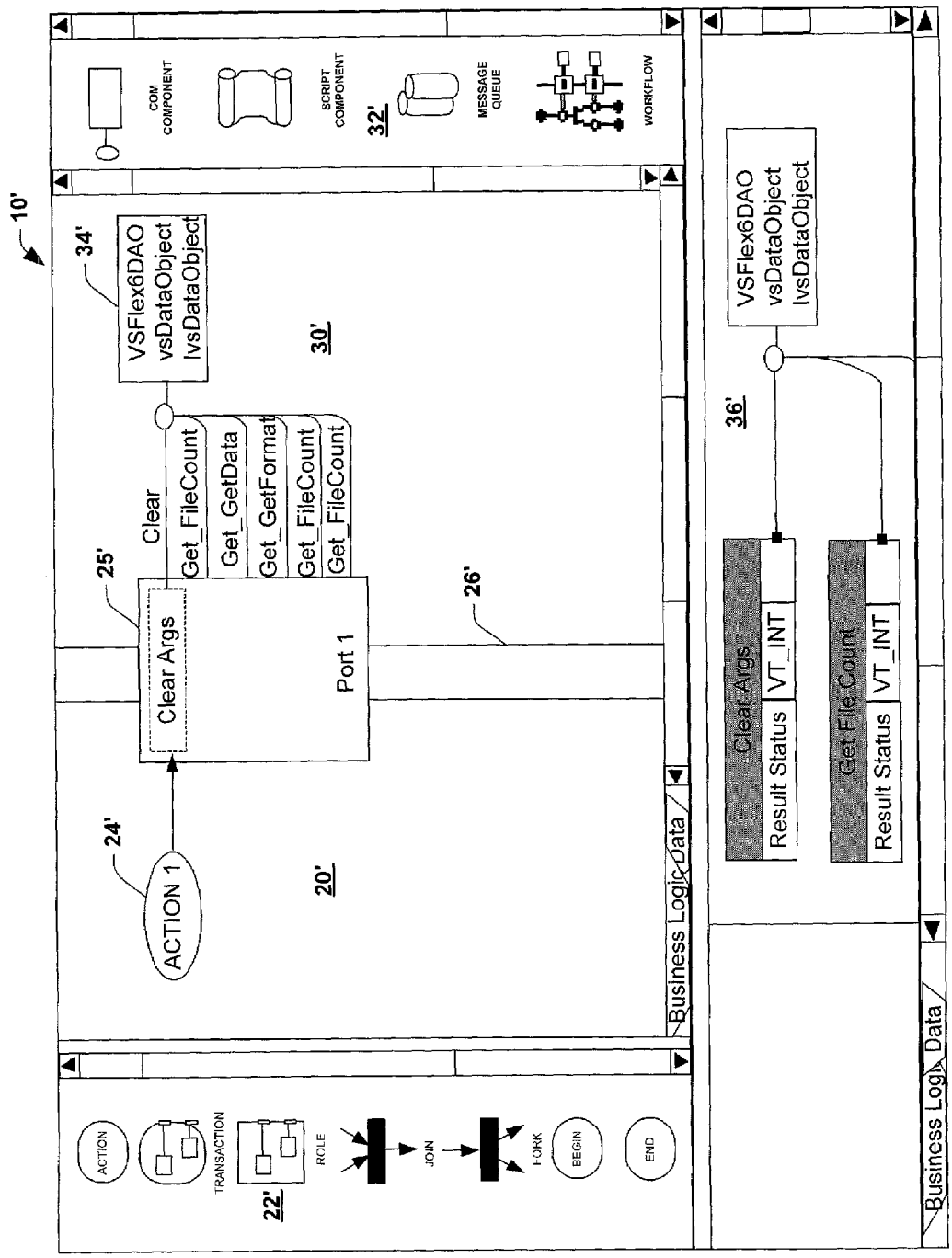
FIG. 2 illustrates a graphical screen of a graphical user interface scheduler program in accordance with one aspect of the present invention.

FIG. 2 illustrates an example of a GUI screen 10' employing the GUI scheduling software of the present invention. The GUI screen 10' includes a business workflow process area 20' and a binding process area 30' separated by a separator bar 26'. The business workflow process area 20' includes a business workflow process 24 consisting of a single action. The single action was generated by clicking on and dragging on an action component in a workflow graphical component menu or stencil 22' into the business workflow process area 20', using a user selection device, for example, a computer mouse. The binding process area 30' includes a single binding component 34' consisting of a COM component. The binding component 34' was created by clicking on and dragging a COM component in a binding graphical component menu or stencil 32' into the binding process area 30', using for example, a computer mouse. The action component 24' is coupled to the COM component via a port 25'. The port 25' is created when the binding component 34' is dragged into the binding process area 30'. A data flow connection screen 36 is provided that illustrates the data flow connections associated with COM component variables and the port 25', allowing a user to view the message flows of the business process to the COM component.

Figure 3:
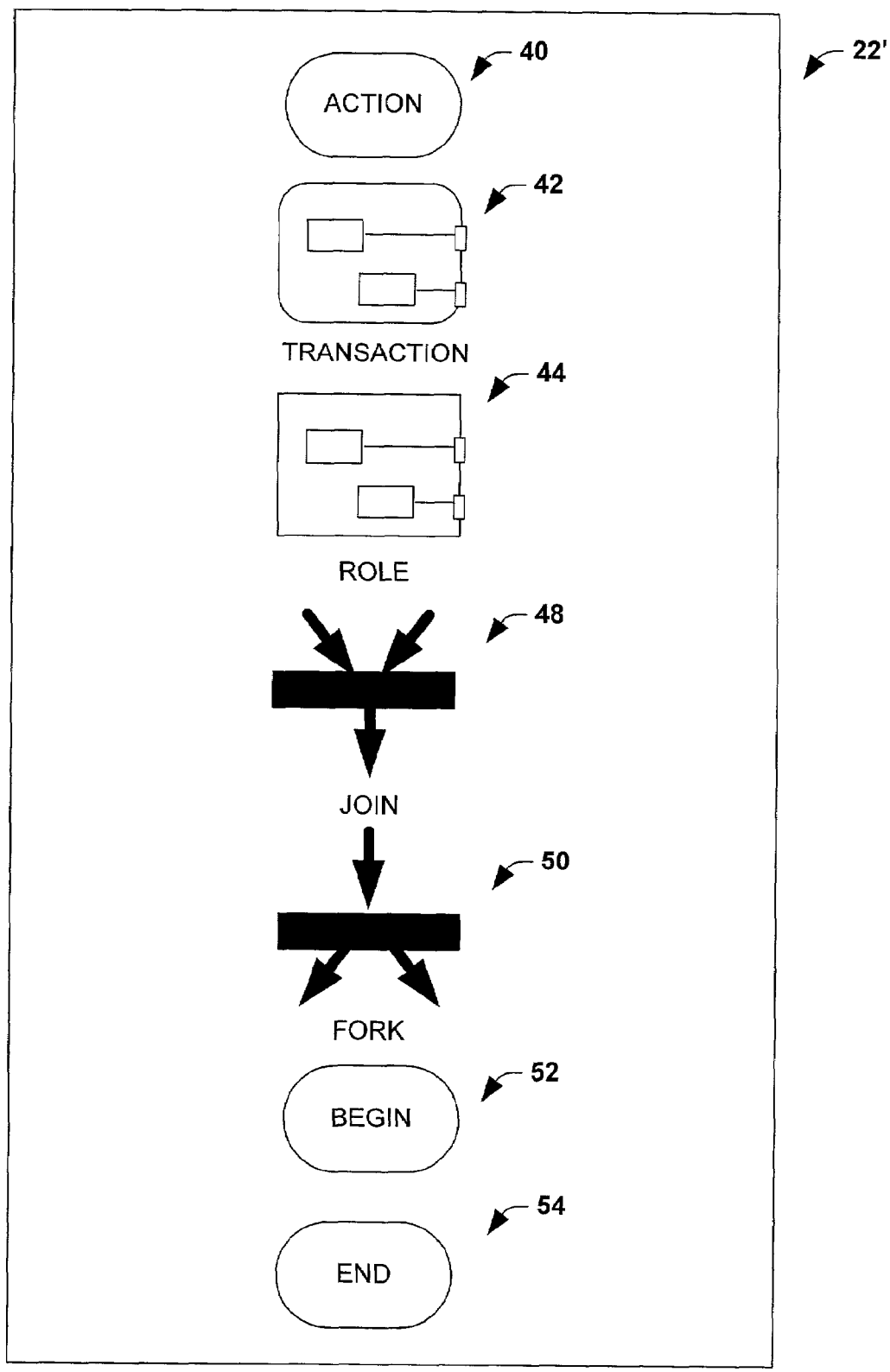
FIG. 3 illustrates a menu of business workflow graphical interface components in accordance with one aspect of the present invention.
Figure 4:
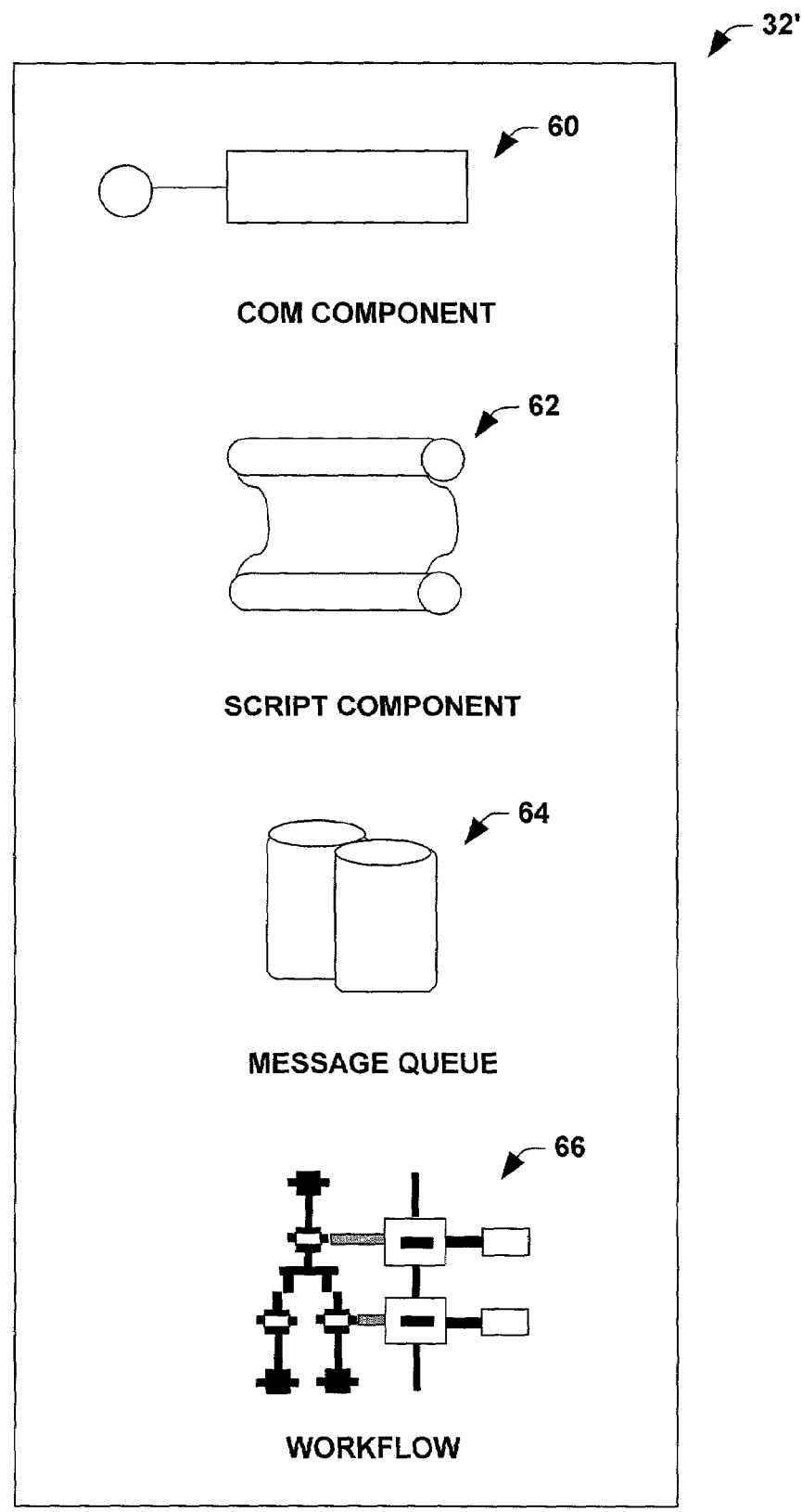
FIG. 4 illustrates a menu of binding graphical interface components in accordance with one aspect of the present invention.

FIG. 3 illustrates an example of components associated with the workflow graphical component menu 22' that may be employed by a user to create a business workflow process model. The workflow graphical component menu 22' includes an action component 40, a transaction component 42, a role component 44, a join component 48, a fork component 50, a begin component 52 and an end component 54. FIG. 4 illustrates an example of components associated with the binding graphical component menu 32' that may be employed to bind the business workflow process model to technological components for real world implementation of the business workflow process model. The binding graphical component menu 32' includes a COM component 60, a script component 62, a Message Queue component 64 and a workflow component 66. It is to be appreciated that the above components are merely examples of possible components and a number of additional components may be provided in accordance with the present invention.

Figure 5A:
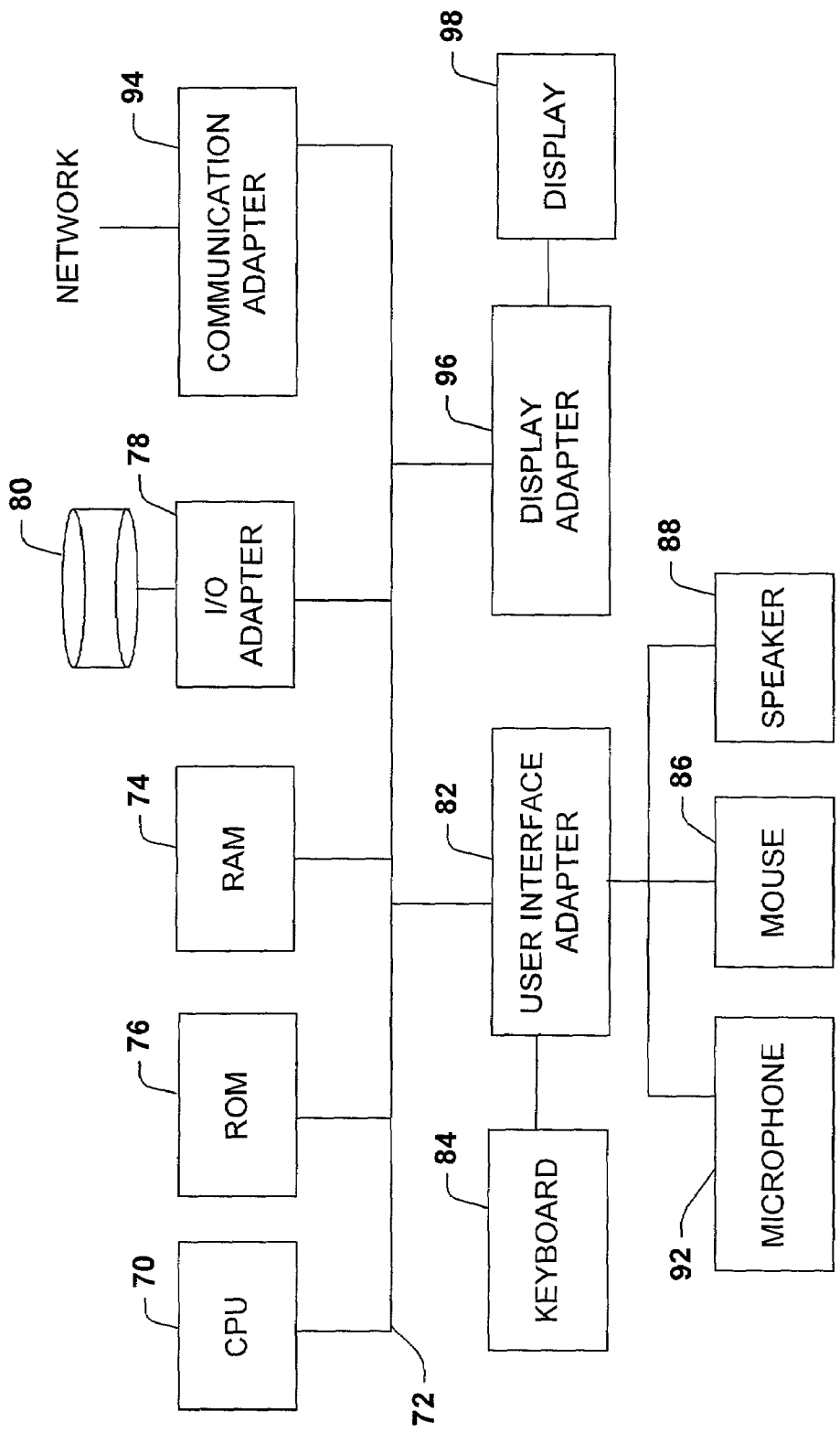
FIG. 5a illustrates a block diagram of a personal computer system in accordance with an environment of the present invention.

One aspect of a system in accordance with the present invention is preferably practiced in the context of a personal computer (PC). A representative hardware environment is depicted in FIG. 5*a*, which illustrates a typical hardware configuration of a workstation or PC in accordance with a preferred aspect having a central processing unit 70, such as a microprocessor, and a number of other units interconnected via a system bus 72. The workstation shown in FIG. 5*a* includes a Random Access Memory (RAM) 74, Read Only Memory (ROM) 76 an I/O adapter 78 for connecting peripheral devices such as disk storage units 80 to the bus 72, a user interface adapter 82 for connecting a keyboard 84, a mouse 86, a speaker 88, a microphone 92, and/or other user interface devices such as a touch screen (not shown) to the bus 72, communication adapter 94 for connecting the workstation to a communication network (e.g., a data processing network) and a display adapter 96 for connecting the bus 72 to a display device 98. The workstation typically has resident thereon an operating system such as Microsoft® Windows® Operating System.

Figure 5B:
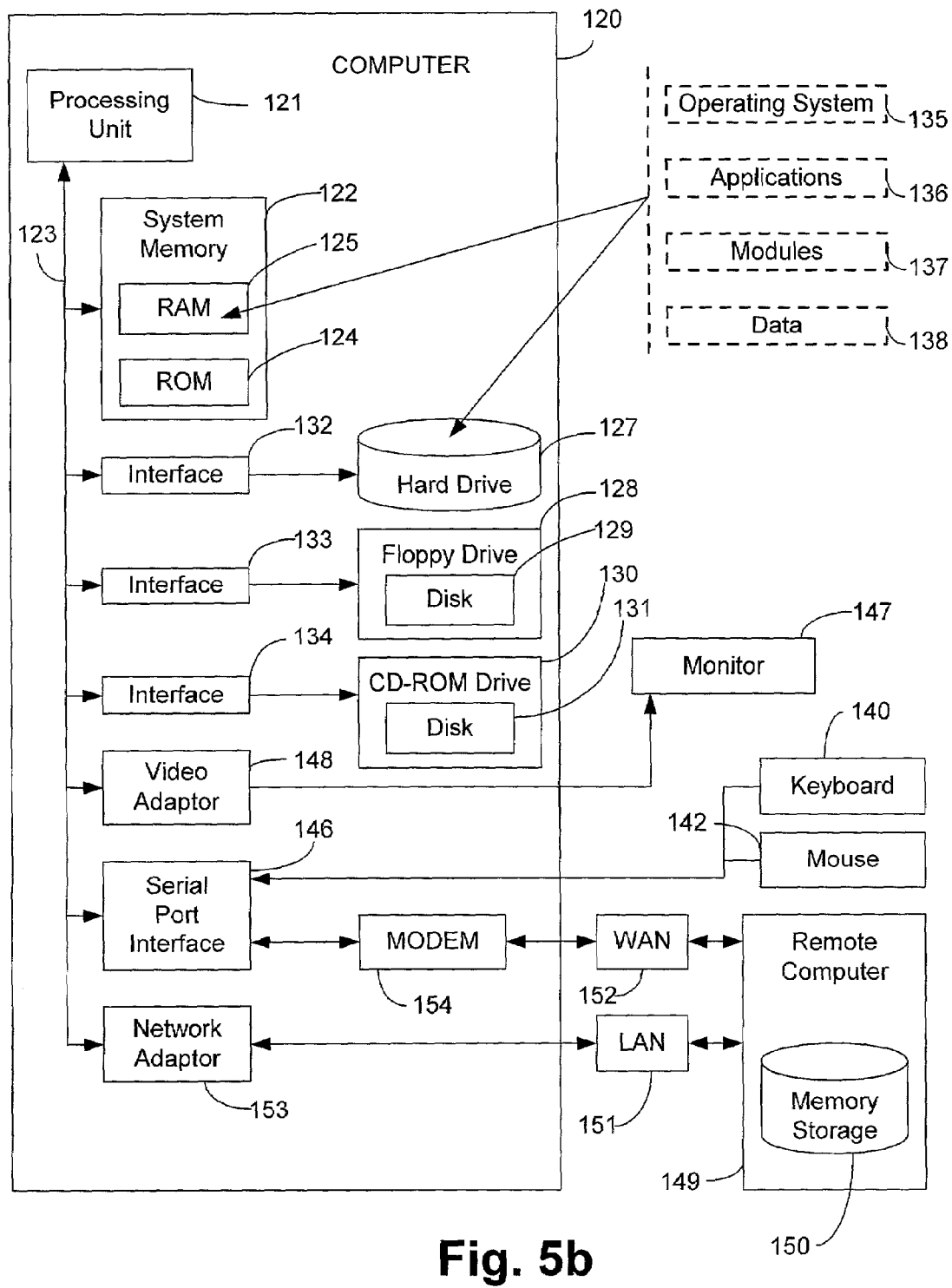
FIG. 5b illustrates a block diagram of an alternate computer system in accordance with an environment of the present invention.

FIG. 5*b* and the following discussion are intended to provide a brief, general description of a suitable computing environment in which the invention may be executed. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated aspect of the invention also is practiced in distributed computing environments where tasks are performed by remote processing devices that are linked through a communications network. But, some aspects of the invention can be practiced on stand-alone computers. In a distributed computing environment, program modules may be located in both local and remote memory storage devices.

With reference to FIG. 5*b*, an exemplary system for implementing the invention includes a conventional server computer 120, including a processing unit 121, a system memory 122, and a system bus 123 that couples various system components including the system memory to the processing unit 121. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 121.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 124 and random access memory (RAM) 125. A basic input/output system (BIOS), containing the basic routines that help to transfer information between elements within the server computer 120, such as during start-up, is stored in ROM 124.

The server computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions, etc. for the server computer 120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 125, including an operating system 135, one or more application programs 136, other program modules 137, and program data 138. The operating system 135 in the illustrated server computer is the Microsoft Windows NT Server operating system, together with the before mentioned Microsoft transaction Server.

A user may enter commands and information into the server computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, server computers typically include other peripheral output devices (not shown), such as speakers and printers.

The server computer 120 may operate in a networked environment using logical connections to one or more remote computers, such as a remote client computer 149. The remote computer 149 may be a workstation, a server computer, a router, a peer device or other common network node, and typically includes many or all of the elements described relative to the server computer 120, although only a memory storage device 150 has been illustrated in FIG. 5*b*. The logical connections depicted in FIG. 5*b* include a local area network (LAN) 151 and a wide area network (WAN) 152. Such networking environments are commonplace in offices, enterprise-wide computer networks, intranets and the Internet.

When used in a LAN networking environment, the server computer 120 is connected to the local network 151 through a network interface or adapter 153. When used in a WAN networking environment, the server computer 120 typically includes a modem 154, or is connected to a communications server on the LAN, or has other means for establishing communications over the wide area network 152, such as the Internet. The modem 154, which may be internal or external, is connected to the system bus 123 via the serial port interface 146. In a networked environment, program modules depicted relative to the server computer 120, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the server computer 120, unless indicated otherwise. Such acts and operations are sometimes referred to as being computer-executed. It will be appreciated that the acts and symbolically represented operations include the manipulation by the processing unit 121 of electrical signals representing data bits which causes a resulting transformation or reduction of the electrical signal representation, and the maintenance of data bits at memory locations in the memory system (including the system memory 122, hard drive 127, floppy disks 129, and CD-ROM 131) to thereby reconfigure or otherwise alter the computer system's operation, as well as other processing of signals. The memory locations where data bits are maintained are physical locations that have particular electrical, magnetic, or optical properties corresponding to the data bits.

Figure 6B:
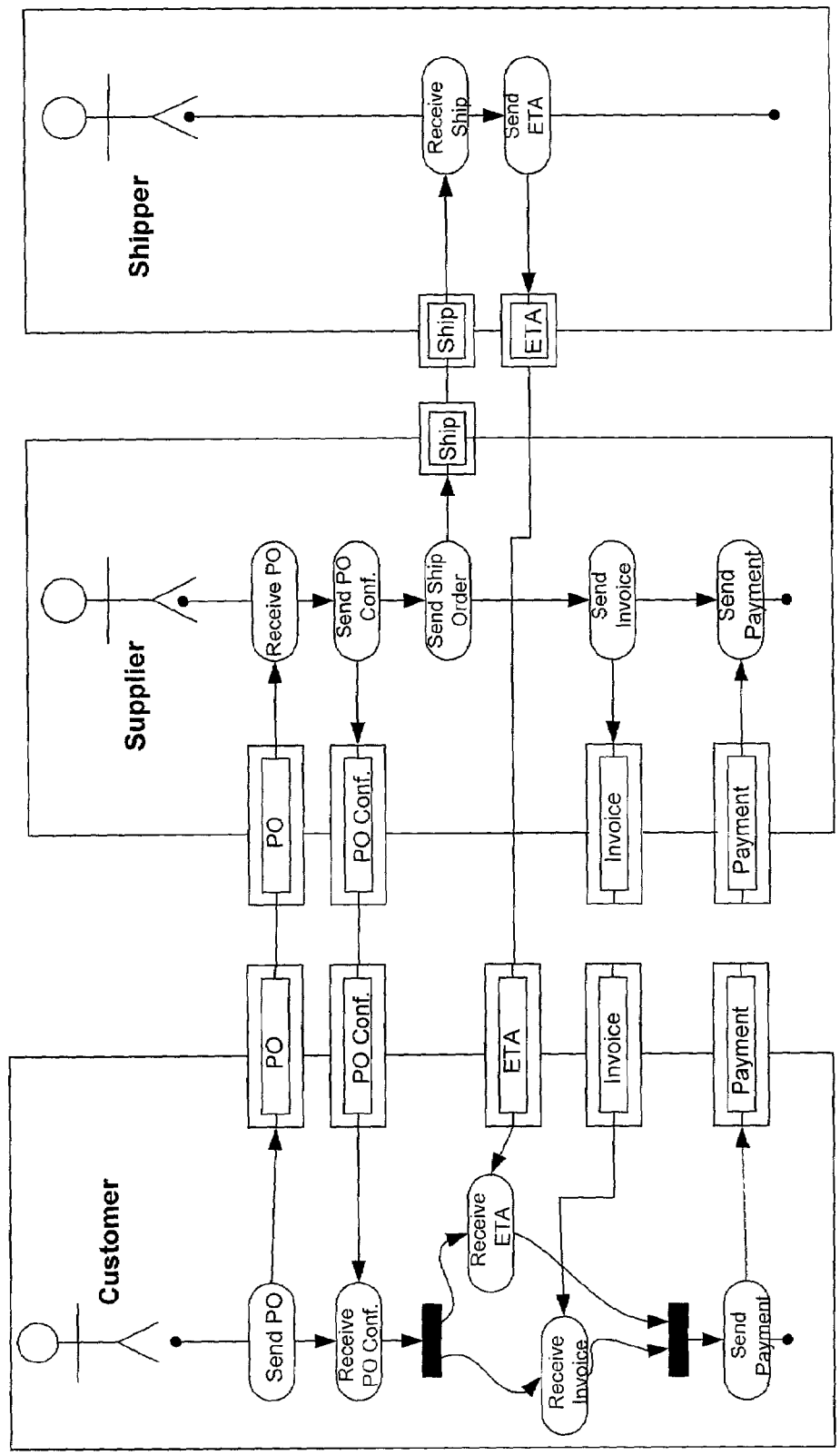
FIG. 6b illustrates a modeling interaction diagram of the simplified purchase interaction of FIG. 6a in accordance with one aspect of the present invention.

FIG. 6*a* illustrates a simple purchase interaction diagram in a system with autonomous interacting agents employing a UML notation. The agents (e.g., customer, supplier and shipper) are autonomous in that their activities are concurrent and their lifetimes independent of one another. The interactions between the agents are manifested as exchanges of messages between each other (e.g., purchase orders, purchase order confirmations, ship order). The following example is centered on describing agents in terms of ordering of messages sent and received by the agents and modeling the entire system as a composition of individual agents. A completed purchase in which a product is received by the customer and the product paid for by the customer, represents a completed business workflow process. FIG. 6*b* illustrates the interaction between customer, supplier and shipper through messages sent and received by the ports. An example of concurrency is illustrated by the invoice receipt action and the ETA receipt action in the customer agent. The GUI scheduler program 10 of the present invention utilizes messages sent and received via ports to model business workflow processes.

Figure 7A:
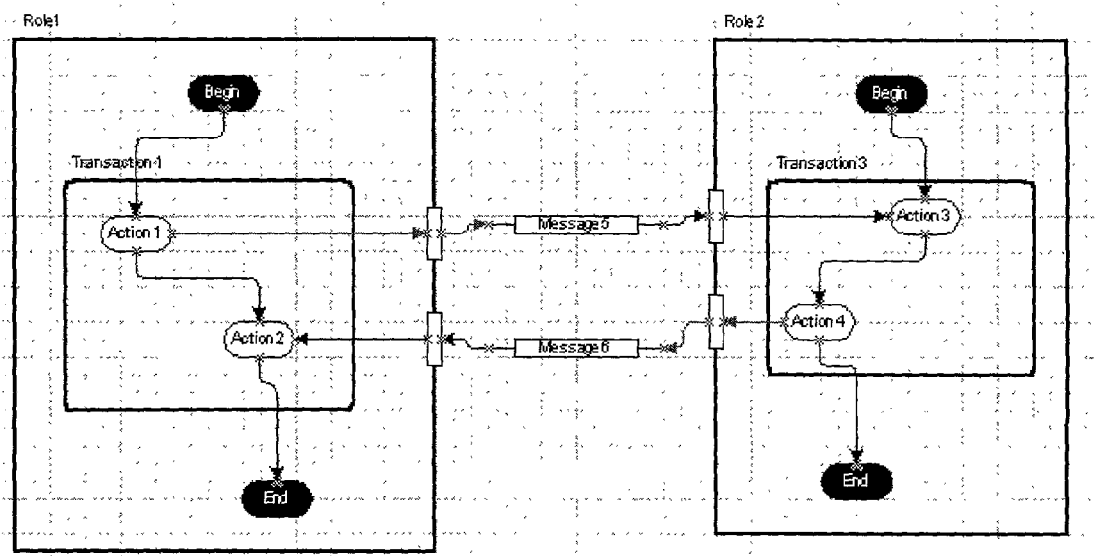
FIG. 7a illustrates an example of nested roles and transactions in accordance with one aspect of the present invention.
Figure 7B:
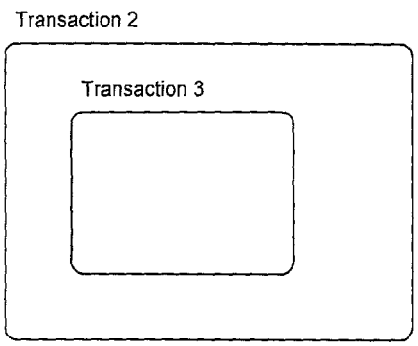
FIG. 7b illustrates an example of valid transaction nesting in accordance with one aspect of the present invention.
Figure 7C:
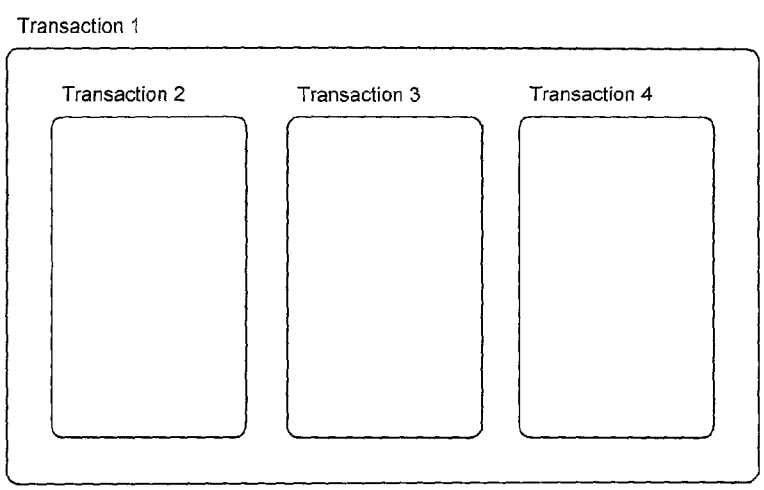
FIG. 7c illustrates an alternate example of valid transaction nesting in accordance with one aspect of the present invention.
Figure 7D:
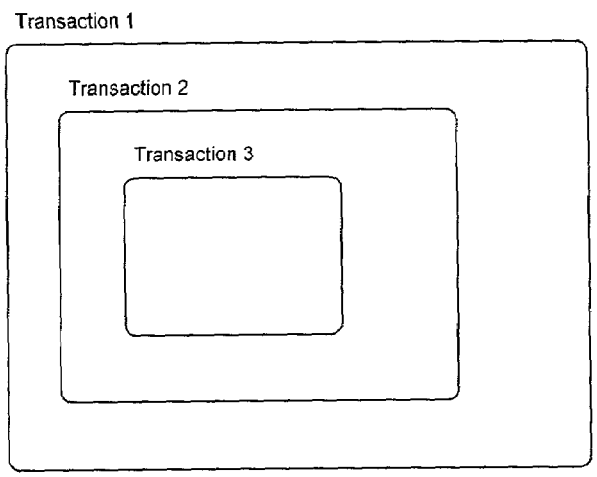
FIG. 7d illustrates an example of invalid transaction nesting in accordance with one aspect of the present invention.
Figure 7E:
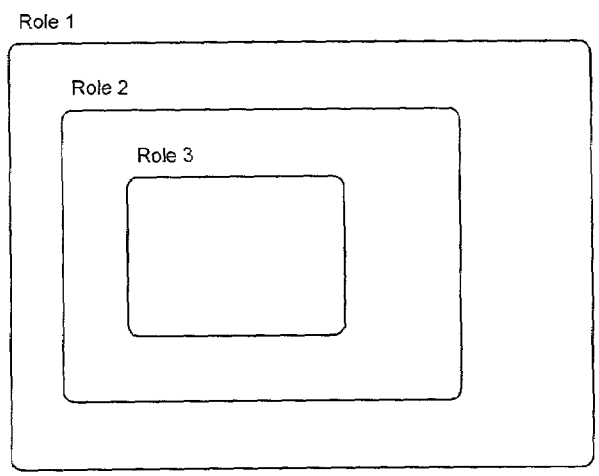
FIG. 7e illustrates an example of valid role nesting in accordance with one aspect of the present invention.
Figure 7F:
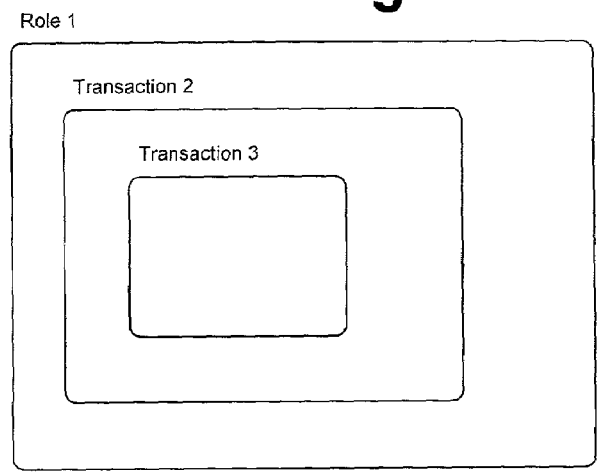
FIG. 7f illustrates an example of valid role and transaction nesting in accordance with one aspect of the present invention.
Figure 7G:
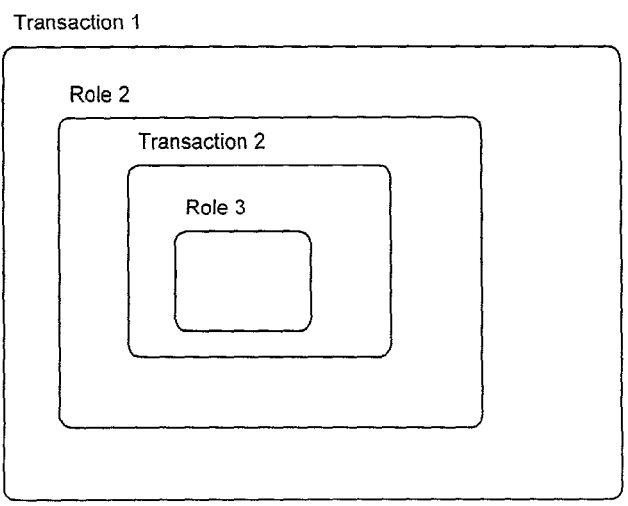
FIG. 7g illustrates an alternate example of valid role and transaction nesting in accordance with one aspect of the present invention.

The present invention will now be described with respect to a rule set associated with the GUI scheduling software 10. A dynamic connector tool can be enabled and resides on a toolbar menu and a flow chart stencil. The present invention supports one construction context with two applications: roles and transactions. The UI includes one shape for roles and one similar shape for transactions, that each translate to contexts in XML. FIG. 7*a* illustrates the nesting of roles and transactions. The role and transaction shapes share most features, such as Cut/Copy/Paste behavior, wiring control flow into and out-of components, RMA's and association. Role shapes have communicative connections and role ports. Transaction shapes can have compensation and catch pages associated with the transaction. Compensation refers to routines invoked on other transactions upon a failure of given transaction, while catch refers to routines invoked on a failed transaction. Transactions can only be nested two levels. FIGS. 7*b* and 7*c* illustrate valid transaction nesting, while FIG. 7*d* illustrates invalid transaction nesting. There is no limitation on the nesting of roles. FIG. 7*e* illustrates valid role nesting. Roles and transactions can be nested within each other as illustrated in FIGS. 7*f* and 7*g*. The only limitation being that transactions can only be nested two levels.

Figure 8C:
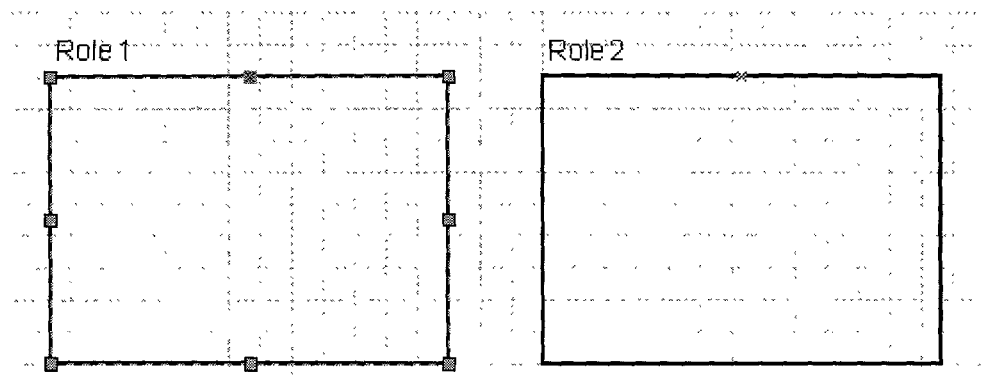
FIG. 8c illustrates examples of legal role associations in accordance with one aspect of the present invention.
Figure 8C:
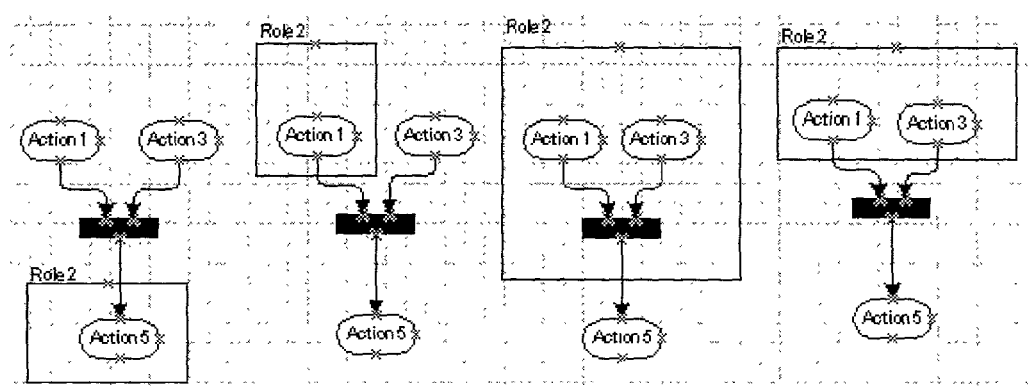

FIG. 8*a* illustrates the role shape highlighted, while FIG. 8*b* illustrates the role shape not highlighted. The role shape has sharp corners, while the transaction shape has rounded corners to differentiate the shape of a role from the shape of a transaction. Once a role is annotated with role ports, it easily differentiated from a transaction. Like the transaction shape, the role shape has only one connection point located at the top center of the shape. The system allows only one incoming control flow to be attached to the role's connection point. This forces the semantics of having only one point of entry into the context of the role. There can be any number of control flows leaving the role. A control flow leaving a role can be attached to any shape to which an action shape can be attached. Control flows that exit a role do so wherever the user desires. The incoming control flow rule is that only one control flow may enter the role. The control flow enters the role at the top center of the role. Maintenance of this rule requires some legal applications of roles and others that will be rejected by the system. FIG. 8*c* illustrates some examples of "legal" role groupings. FIG. 8*d* illustrates a role before association and FIG. 8*e* illustrates a role after association. The role shape can have different changes upon association depending on whether or not there is an incoming control flow. If there is an incoming control flow, then that control flow will have to be re-connected to the role's connection point, and another connector shall be added, attaching the role's connection point to the action state that was originally attached to the incoming control flow. There is no special processing for the control flows that exit a role. Not all role enclosures are legal. FIG. 8*f* illustrates an illegal role association. There are two control flow lines entering the role. If the user attempts to associate the role with the enclosed shapes, the system will present an error message. This role can't be associated because there is more than one control flow path into the role.

Figure 9:
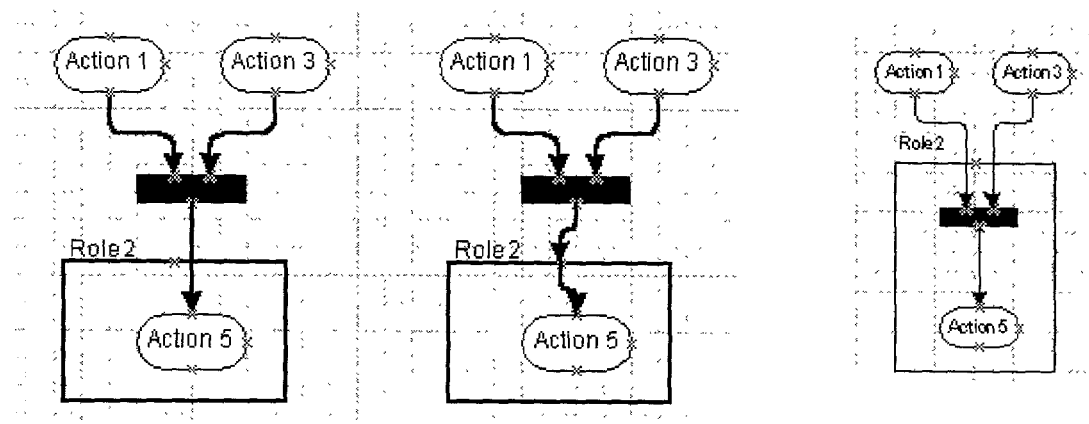
FIG. 9 illustrates an example of possible role connections in accordance with one aspect of the present invention.
Figure 9:
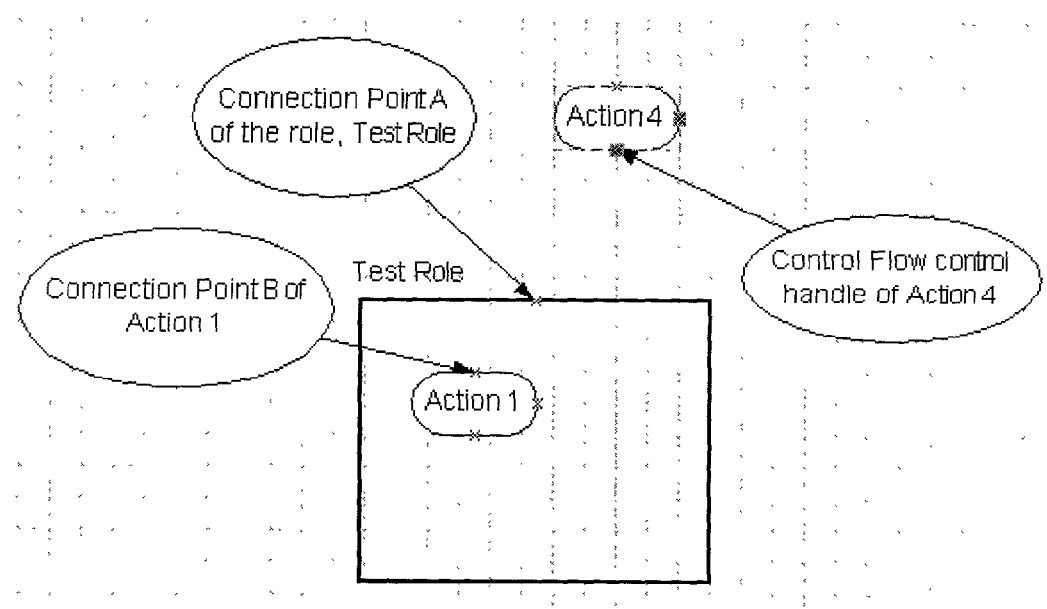
Figure 10:
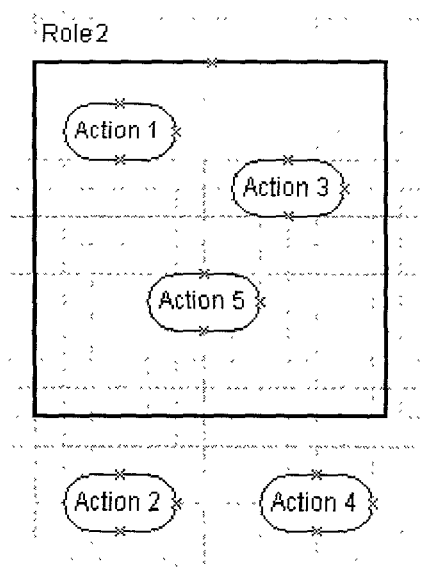
FIG. 10 illustrates an example of an associated role with three shapes in accordance with one aspect of the present invention.

Referring now to FIG. 9, a user is prevented from dragging a control flow control handle from a shape outside of a role to a shape inside of a role, once an action is associated with the role. For example, assuming that the action 1 is already associated with the test role, if a user drags the control flow control handle of action 4 to the connection point B of action 1, the system shall present an error message and delete the created connection. To specify control flow into a role, a user can connect to the role itself first, and then from the role to the action within the role. The user can drag the control flow control handle of action 4 to the connection point A of the test role in the diagram illustrated in FIG. 9. The user can also drag the control flow control handle of the test role to the connection point B on the action shape because it is one of the shapes that are associated within the test role. A user shall be able to drag the control flow control handle of the role to one of its associated shapes that can accept an incoming control flow. Once drawn, if the control handle is dragged to another shape in the role, this new connection replaces the previous connection (e.g., the role does not fork to many control flows, only one control flow comes out, which could optionally lead to a fork or any other flow chart shape). A user shall be able to drag the control flow control handle of one of the associated shapes to any of the associated shapes or any shape outside of the role, that is not within either a role or transaction. For example, referring to FIG. 10, a user can drag the control flow control handle of role 2 to actions 1, 3, 5 only. The user can drag a control flow control handle of action 1 to actions 1, 3, 5 as well as action 2 and 4

Figure 11A:
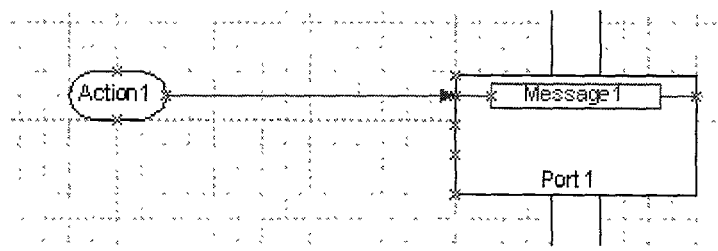
FIG. 11a illustrates an example of an action shape attached to an Implementation port in accordance with one aspect of the present invention.
Figure 11B:
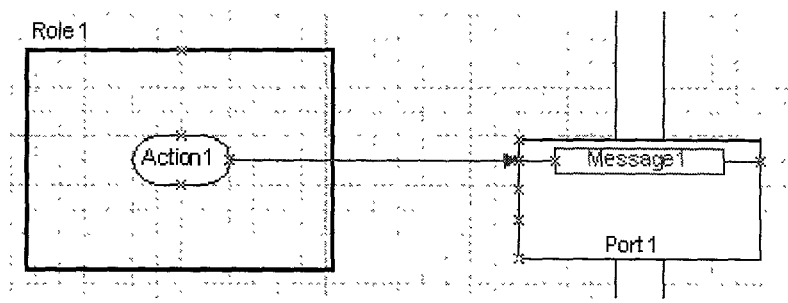
FIG. 11b illustrates an example of a role dropped but not associated in accordance with one aspect of the present invention.
Figure 11C:
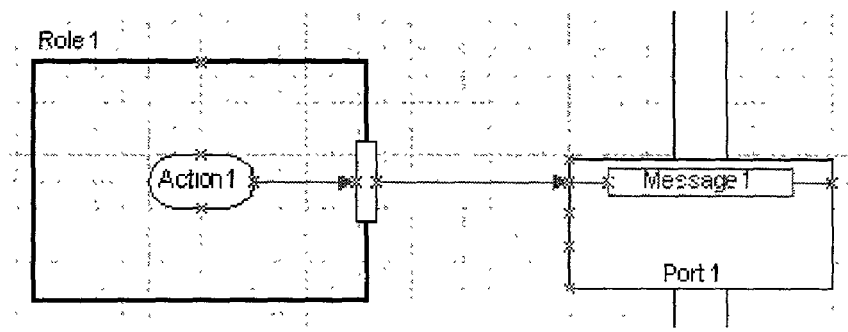
FIG. 11c illustrates an example of a role dropped and associated in accordance with one aspect of the present invention.

FIGS. 11*a*–11*c* illustrate communication of a role with an implementation port. If a user drags the control flow control handle of a role that is associated to a shape that is not associated with the role, the system will delete the connection and present an error. The role's control flow will begin with an action associated with the role. The shape will be associated with the role and not with a role or transaction that is nested inside of the role. A role port is added on the outside of the role during the association process for each enclosed action shape that is attached to a port. FIG. 11*a* shows an action shape attached to a port. FIG. 11*b* illustrates a role that includes an action associated with a port where the action is not associated with the role. FIG. 11*c* illustrates the creation of a role port on the outside of the role during the association process for each enclosed action shape that is attached to a port where the action is associated with the role.

Figure 12A:
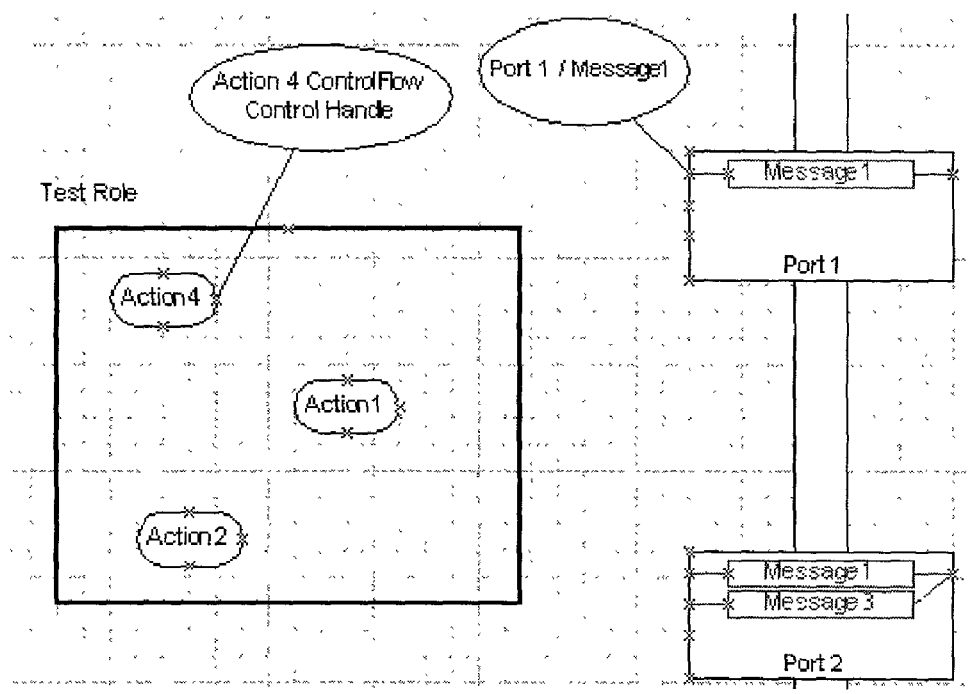
FIG. 12a illustrates an example of an associated role prior to port attachment in accordance with one aspect of the present invention.
Figure 12B:
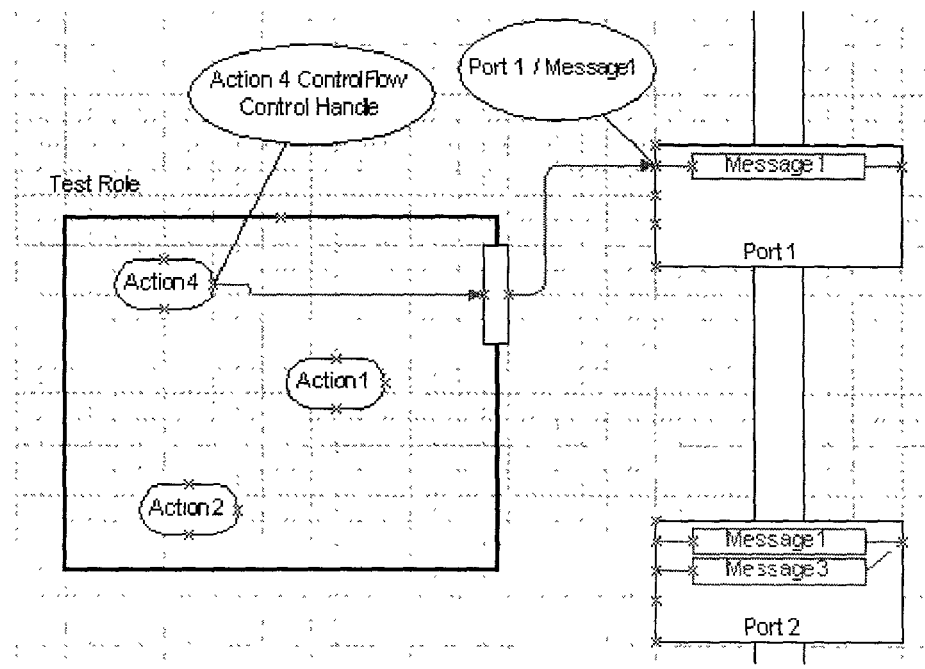
FIG. 12b illustrates an example of an associated role after port attachment in accordance with one aspect of the present invention.
Figure 13:
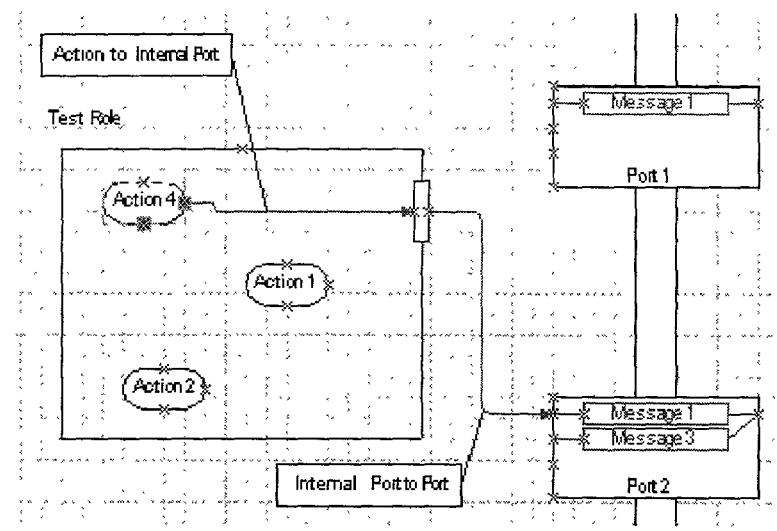
FIG. 13 illustrates an example of manipulation of actions in an associated role in accordance with one aspect of the present invention.

Referring to FIG. 12*a* illustrating an associated role with three action shapes that are not connected or attached to a port. If a user drags the action-to-port control handle of action 4 to the port 1/Message 1 connection point, the result will be the diagram of FIG. 12*b*. A new role port is added to the right hand edge of the port at the same Y location as the action shape. A connector is created between the action shape and the new role port. Another connector is created between the role port and the port on the spacer bar. A user can switch the role port from the right edge to left edge of the role and vice-versa via an RMA on the role port. When a role port is created for connection to a port on a separator bar, the default location of the role port will be on the right side of the role. When a role port is created for connection to another role port, the default location will be the side of the role closest to the other role port. A user will be able to RMA on any point between the action and the destination (port on separator bar or another action in another role) to switch the directionality of the connection from send to receive. If a user drags the action-to-port control handle of action 4 to another port such as port 2/Message 1, then the system will re-wire the role port-to-port connector to that new port as shown in FIG. 13. Role ports do not have any control handles. To specify or re-specify an action to port connector, the user may drag an action's action to port control handle and drop it on a valid port connection point.

Figure 14A:
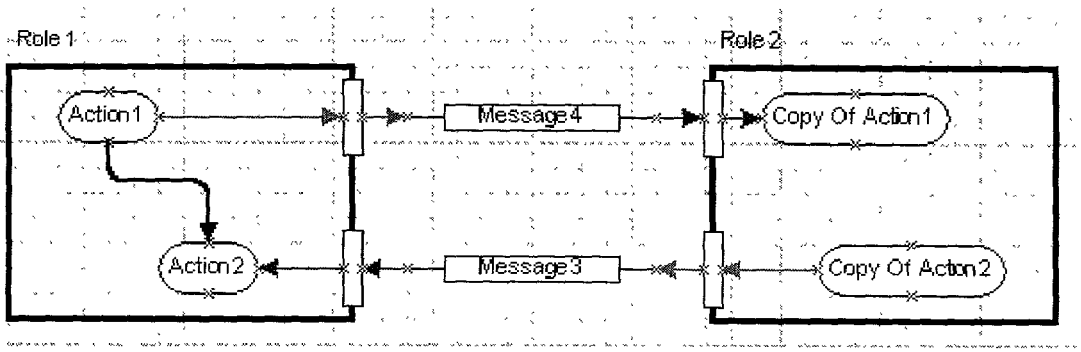
FIG. 14a illustrates an example of two roles with two communicates in accordance with one aspect of the present invention.
Figure 14B:
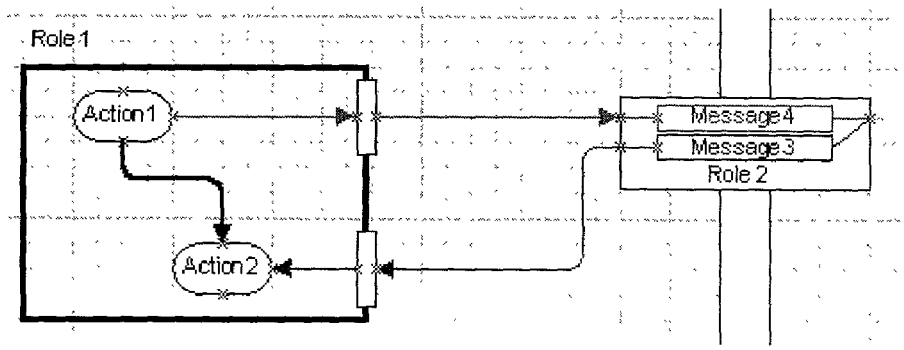
FIG. 14b illustrates an example of a deletion of the second role of FIG. 14a in accordance with one aspect of the present invention.
Figure 14C:
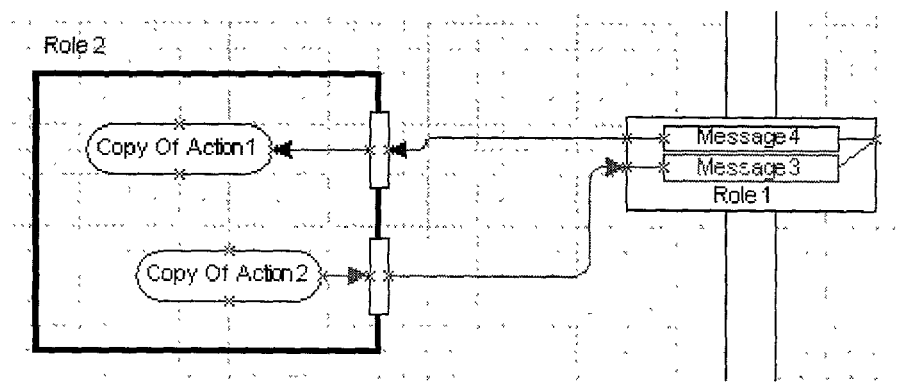
FIG. 14c illustrates an example of a deletion of the first role of FIG. 14a in accordance with one aspect of the present invention.

FIGS. 14*a*–14*c* illustrate communications between roles. Referring initially to FIG. 14*a*, a user can drag an action's action to port control handle to an action state that is contained inside of another role. This will create a communicate connection, consisting of two role ports, one on each role, and a communicates message. The default orientation of the communicates message will be horizontal. If a user deletes the action to role port connector, the role port-to-port connector as well as the role port shall be removed. If a user deletes the role port-to-port connector, the action to role port connector will also be removed. If a user deletes the role port, the role port-to-port connector as well as the action-to-role port connector will be removed. If a role is deleted, a user will be prompted to delete just the role shape, or everything within it. If deleting the role with all innards is selected, the GUI scheduler program deletes all of the associated shapes as well as any role ports, action-to-role port connectors, and role port-to-port connectors that are attached. If the deleted role participates in a communicates connector, then a new external port is created that represents the newly deleted role with the name of the deleted role. A new port message is created in the new port for each communicates port message that gets deleted as a result of deleting the role. The role port for each action to port connection will be moved to the right, to be near the new port on the separator bar.

FIG. 14*a* illustrates two roles communicating. If the user deletes role 2, the system creates a diagram similar to the one illustrated in FIG. 14*b*. A new port was added to the separator bar that has the same name as the deleted role. Similarly, if the user deleted role 1 from the diagram in FIG. 14*a*, the system would generate a diagram similar to the one in FIG. 14*c*. Again the new port is named the same as the deleted role. Furthermore, the Send/Receive value of the port message is obtained from the remaining role, role 2. Table 1 illustrates the properties associated with roles in various states. Role ports have no properties.

TABLE I

ROLE SHAPE PROPERTIES

| Shape and shape state | Menu option | | Description | |
|---|---|---|---|---|
| Role, Unassociated | 1. Edit Properties . . . <br> 2. Associate the Enclosed actions Within the role | | 1. Raise property sheet <br> 2. "Group" all shape enclosed within the role shape into the role. Do semantic checks such as only 1 control flow in. | |
| Role, Associated | 1. Edit Properties . . . <br> 2. Disassociate the Enclosed actions Within the role | | 1. Raise property sheet <br> 2. "Ungroup" all shapes enclosed with the role shape. The control flow connection to the role is extended to the first shape connected within the role. | |
| Role Port | 1. Change direction of connection to [sink/source] <br> 2. Move shape to [left/right] of role shape | | | |
| Name <br> Must be unique amongst roles, transactions, and ports. | String | | Unique name to refer to role | |
| Association State (Roles) | Toggle [Associated/ Unassociated] | | | |

Figure 15:
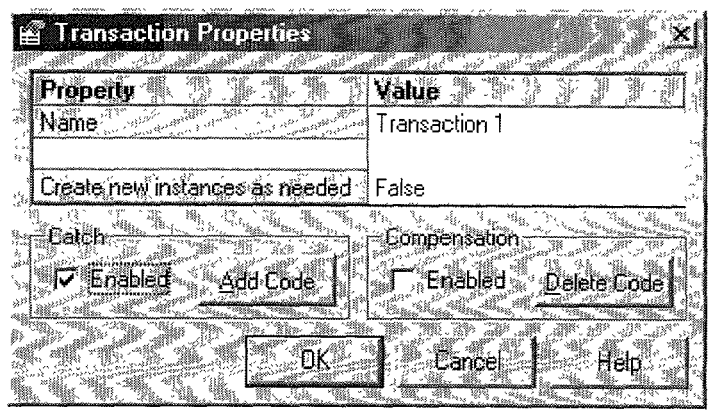
FIG. 15 illustrates an example of a (GUI) Transaction Property Editor in accordance with one aspect of the present invention.

Transactions have two additional properties that roles lack, that is enable compensation and enable catch. These properties can be enabled independently. FIG. 15 illustrates a pop-up window (GUI) showing transaction properties. If either catch or compensation is enabled, then a new view is created, either "compensation for [transaction-name]" or "catch for [transaction-name]." These views are represented by tabs at the bottom of the page, similar to Business Logic and Data tabs (See FIG. 2). Since transactions can be nested, an interior transaction may have both a catch and a compensation transaction. Those transactions themselves may have both a catch and a compensation transaction. The Business Logic page, which contains root transactions, catch, and compensation pages all look and feel the same, but have completely independent control flows. However, they all share the same separator bar, ports, message, and bindings. Like the main Business Logic page, each catch or compensation page is created only with a begin shape on the flow chart side. Each page can be viewed simultaneously using windowing features. Cut/Copy/Paste are possible between all views (business logic and each compensation or catch page). All workflows will start out with an undeletable "Workflow Catch Page" which is the default error handler for the entire workflow. In this case, there will be three initial pages, Business Logic, Data flow and Workflow Catch. Table 2 illustrates the properties associated with transactions in various states.

TABLE 2

TRANSACTION SHAPE PROPERTIES

| Property Name | Data Type | Description |
|---|---|---|
| Name Must be unique amongst roles, transactions, and ports. | String | Unique name to refer to role |
| Type | Combobox: Short lived DTC style transaction Long running compensation based Short lived is default | |
| Retry count | Integer (default 0) | |
| Back off time (seconds) | Integer (no default) | |
| transaction timeout (seconds) | Integer | Enabled only for a short lived transactions |
| Isolation level | Combobox: Serializable Read uncommitted Read committed Repeatable read Serializable is the default | |
| Enable Catch | Boolean [Off by Default] | Changing this setting has no visual affect in the Designer. This only changes a setting in the exported XML. |
| Enable Compensation | Boolean [Off by Default] | Changing this setting has no visual affect in the Designer. This only changes a setting in the exported XML. |
| [Add/Delete] Catch Sheet | Button | Adds or deletes the Catch sheet. If delete, the user will be prompted "Are you sure you want to delete the Catch sheet for this transaction?" |
| [Add/Delete] Compensation Sheet | Button | Adds or deletes the Compensation sheet. If delete, the user will be prompted "Are you sure you want to delete the Compensation sheet for this transaction?" |

If an action is dropped, no ports or port-messages will be created. If an action is rewired to an existing port a new port message is created that can refer to an existing message or new message depending upon where connection is dropped. A user can connect an action within an associated role (from left or right side) to another action (left or right side) within another (different) associated role. Fields in the new message shape are added and populated from the information from the method (first method selected), if bound to a COM shape. Action to implementation port connectors can be selected and deleted. If any one of (action to role port, role port, role port to communicates message) are deleted, the entire communication connection is deleted (potentially leaving an unused message on the data page). If an action is deleted, any action to port connectors will be deleted, which may trigger a dangling communicates and the creation of a new implementation port.

Figure 16A:
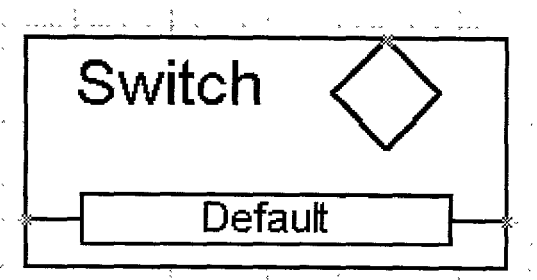
FIG. 16a illustrates an example of a (GUI) switch shape when first dropped onto a page in accordance with one aspect of the present invention.
Figure 16B:
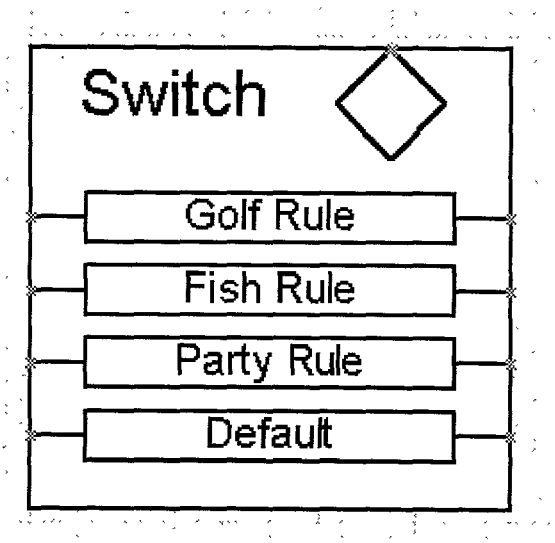
FIG. 16b illustrates an example of the (GUI) switch shape of FIG. 16a with three rules added in accordance with one aspect of the present invention.

FIG. 16a illustrates a switch shape that is provided for providing a decision component for the GUI scheduling program. The switch shape can map directly to an XML programming language component. The switch shape contains rule shapes. Rule shapes are uniquely named. Default rule names will be "Rule x" where x is an integer 1, 2, etc., similar to the auto naming of ports, actions, transactions, etc. Multiple switch shapes can contain the same rule. A specific rule will only be used once within a specific switch. Cleanup will delete rules that are no longer used in any switch shapes. Cleanup is a term used to refer to two menu options under the Tools menu. Each option deletes shapes. Each Switch shape always has one, un-editable, "Else" rule shape. When a switch shape is originally dragged onto the page, the only rule will be Default. A user will need to edit properties on the shape to add additional rules, such as the three new rules added to the switch shape illustrated in FIG. 16b. Each switch shape will size itself according to the longest rule that it contains. Each rule will be the same size. The shape has one connection at the top of the diamond where the flow enters the shape. Each rule can have one connection coming out of either the left or right side. A user can wire the rule by dragging the control handle located at the left or right edge of the rule. Redrawing a rule outbound connection, from either side, will not require deletion of the previous connection. The newly drawn control flow connection will replace the old one.

Figure 17:
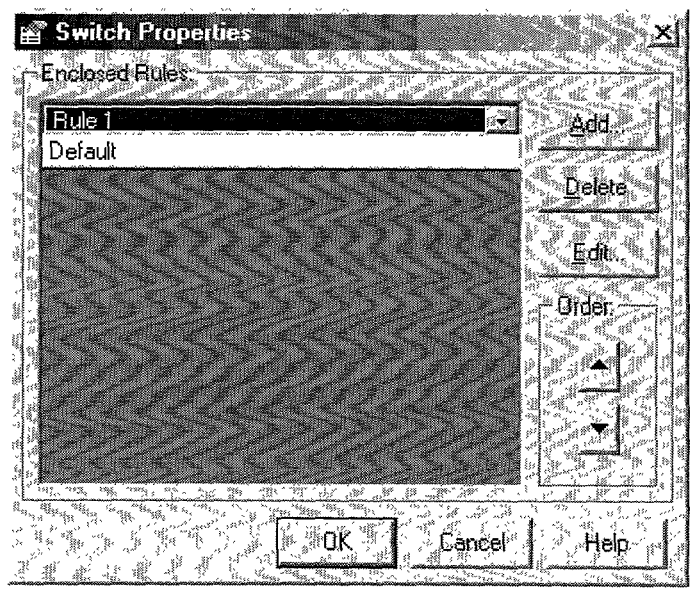
FIG. 17 illustrates an example of a (GUI) Switch Property Editor in accordance with one aspect of the present invention.
Figure 18:
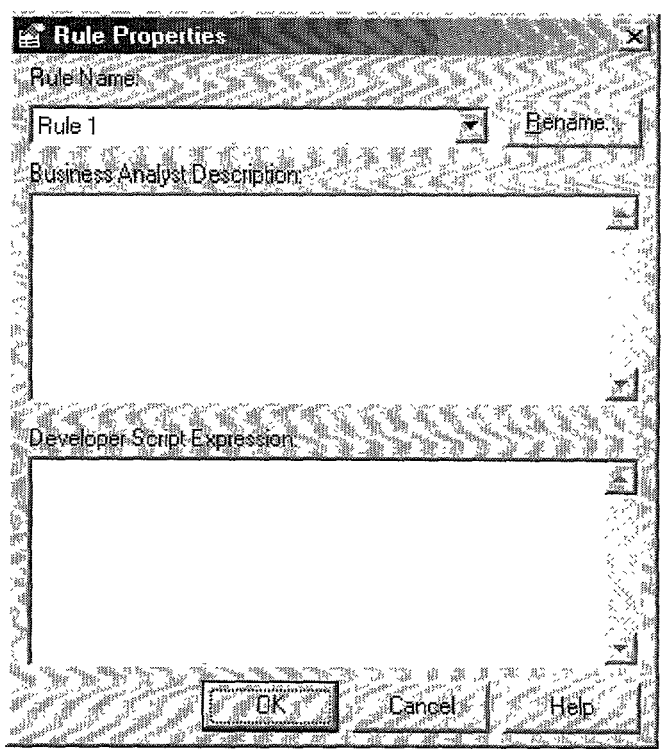
FIG. 18 illustrates an example of a (GUI) Rule Property Editor in accordance with one aspect of the present invention.

FIG. 17 illustrates an editable pop-up window (GUI) showing switch properties. Switches can be edited to enable a user to add new and existing rules to the switch, remove rules, reorder the rules or edit the rules. "Default" is not part of the picklist available to a user when selecting a rule from the "existing" rules. The "Add" button will create a new rule with a new unique name and add it to the switch. This new rule will be highlighted, so that all the user has to do is click on "Edit" with a pointer. Editing a port message within a port affects everywhere the message/port-message is used and editing a rule within a switch affects everywhere the rule is used. FIG. 18 illustrates an editable pop-up window (GUI) showing rule properties. The rule editor can be raised by selecting the shape on the business logic page and RMA edit properties and by selecting the rule in the switch editor and selecting "Edit". The "Else" rule is not editable and is not displayed in the decision editor. The user can select a switch shape and delete it from the page, similar to any control flow shape. This will not completely delete the rules and therefore cleanup can be used. This is very similar to deleting a port that contains messages. Selecting a rule shape and pressing delete will delete a rule from a switch and any control flow connection out of that rule in the switch. However, that rule is still available for selection in any other switch. Cleanup can be used to delete unreferenced rules entirely. Rules are not completely deleted even if they no longer have any instances. The rules "cleanup" shall occur when the user cleans up the unused ports and messages. Therefore, the user will not lose any data that they enter without some user specific action.

Figure 19A:
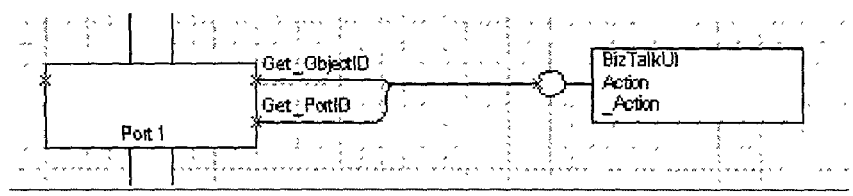
FIG. 19a illustrates an example of a bound COM component in accordance with one aspect of the present invention.
Figure 19B:
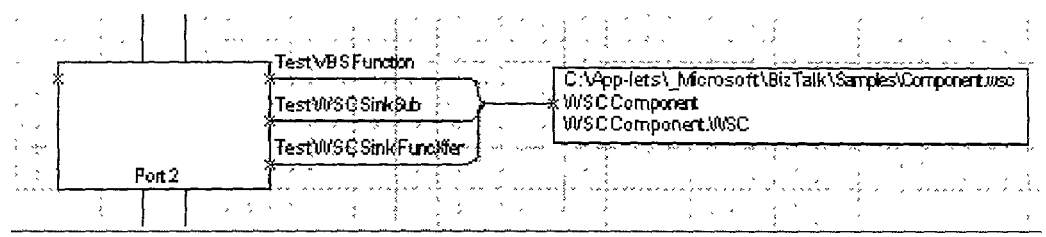
FIG. 19b illustrates an example of a bound Script component in accordance with one aspect of the present invention.
Figure 19C:
FIG. 19c illustrates an example of a bound MSMQ component in accordance with one aspect of the present invention.
Figure 19D:
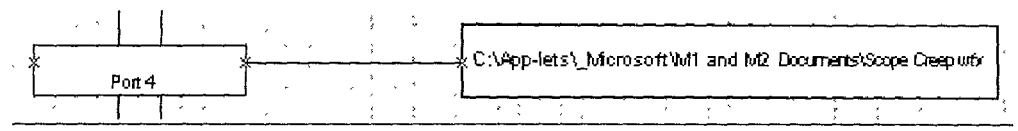
FIG. 19d illustrates an example of a bound schedule in accordance with one aspect of the present invention.

FIG. 19a illustrates a bound COM component with a method breakout connector. FIG. 19b illustrates a bound Script component, while FIG. 19c illustrates a bound MSMQ component. FIG. 19d illustrates a port bound to another schedule. Ports bound to schedules can send messages. Binding is employed by selecting a component from the binding graphical component menu or stencil 32' and dragging it into the binding process area 30'. When this component is dropped into the binging process area 30', a wizard will start to walk the user through the binding. If the user cancels at any time during the wizard prior to selecting the "Finish" button, the dragged binding shape shall be deleted. The wizards can be started by dropping a binding shape from the menu or stencil and by employing an RMA on an existing binding shape or breakout connector. All states from previous wizard runs will be kept to enable the user to click next to get to the page they want to edit. The first page of every wizard asks the user to specify a port to bind. The user can specify an existing unbound port or enter a new unique port name. If the user specifies binding to a new port, when the wizard is completed, a port shape is added on the separator bar at the same 'Y' value as the binding shape. Port message is not created as a result of any of the binding wizards. Messages are not created on the data page as a result of any of the binding wizards.

Figure 20A:
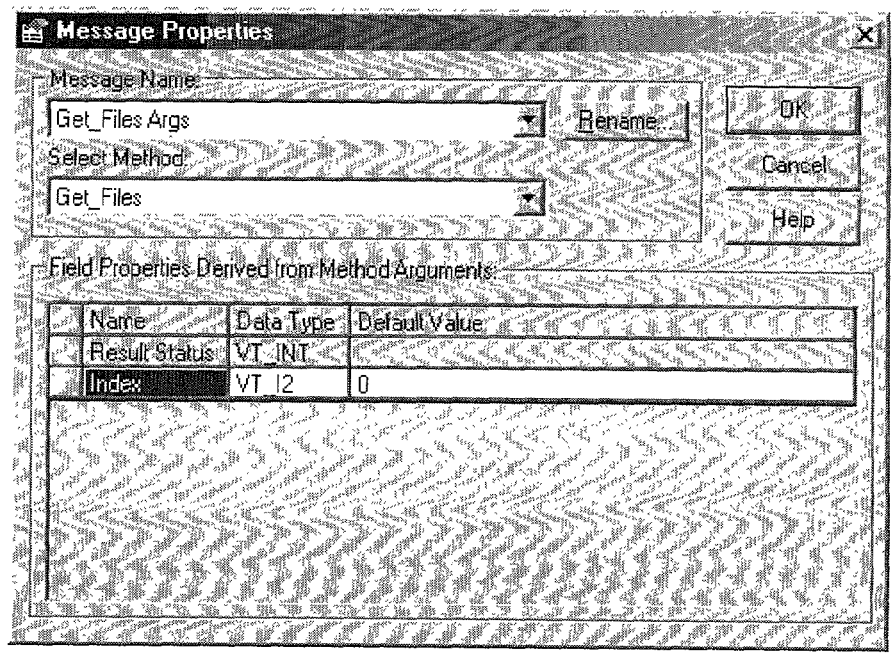
FIG. 20a illustrates an example of a (GUI) Method Message Editor for COM components in accordance with one aspect of the present invention.
Figure 20B:
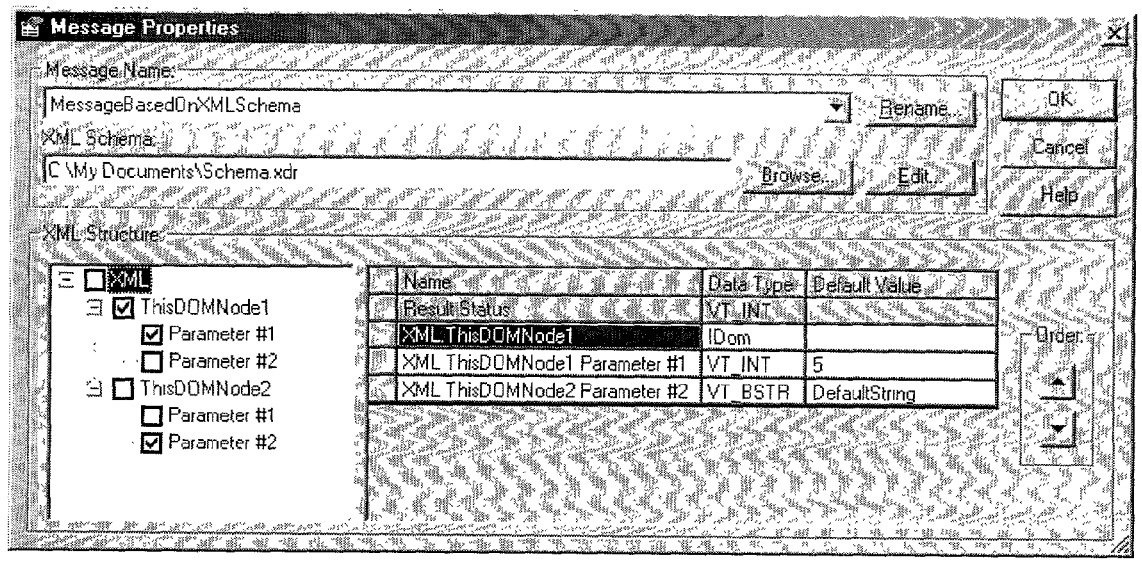
FIG. 20b illustrates an example of a (GUI) XML Message Editor in accordance with one aspect of the present invention.
Figure 20C:
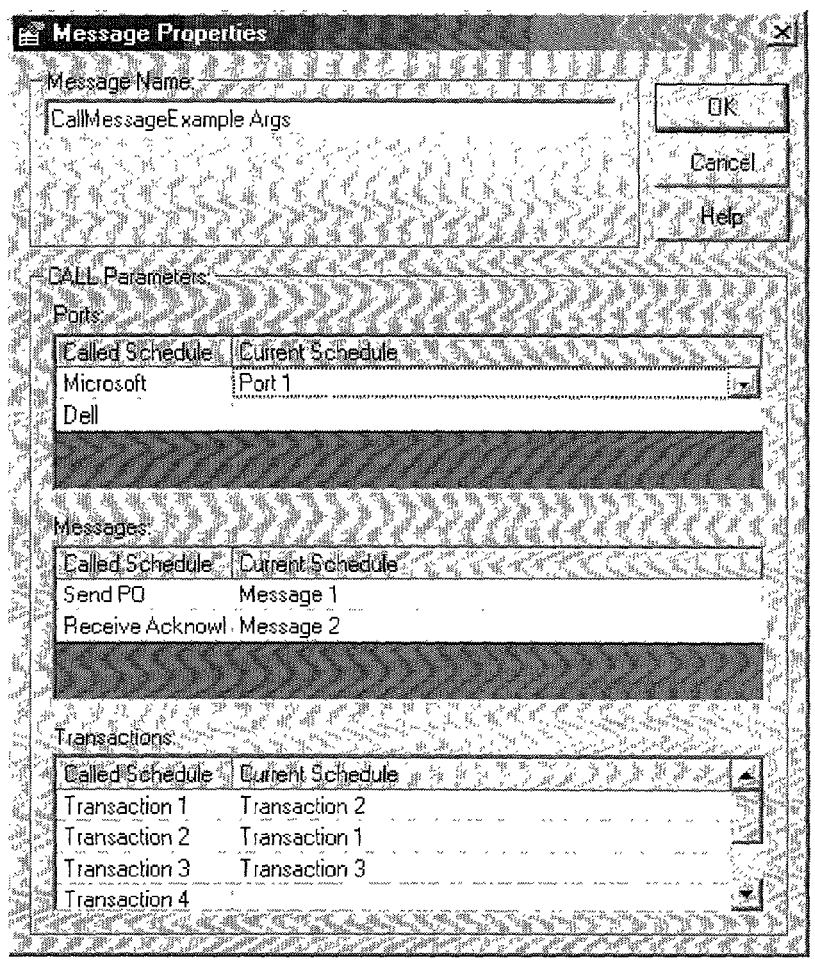
FIG. 20c illustrates an example of a (GUI) CALL Message Editor in accordance with one aspect of the present invention.
Figure 20D:
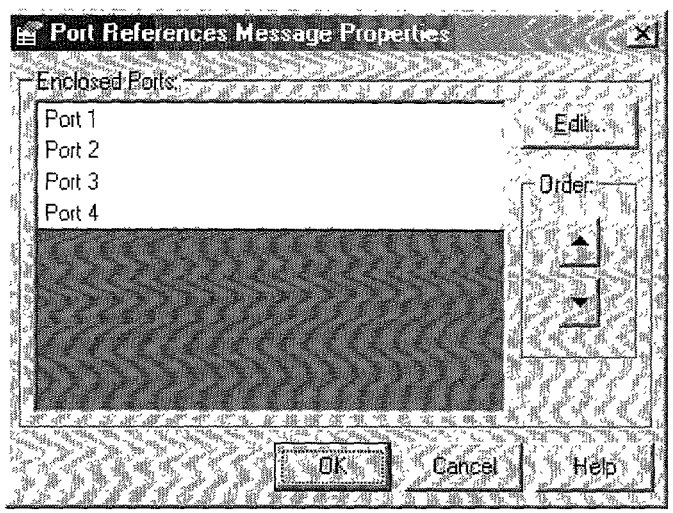
FIG. 20d illustrates an example of a (GUI) Port References Message Editor in accordance with one aspect of the present invention.

The UI provides a different message editor form for each binding technology. There is no enforcement of having one message flow to ports all bound to the same technology. When the user selects a message to edit on the business logic pages, the UI will display the message editor of the port within which the message was selected. If the message flows through ports of different binding types, when the user selects a message to edit on the data page, they will be presented with an option as to which message editor to use. FIG. 20*a* illustrates a message editor for methods. FIG. 20*b* illustrates a message editor for XML, while FIG. 20*c* illustrates a message editor for CALL. FIG. 20*d* illustrates a Port References Message Editor.

Every message has two system fields ("Result Status", int) and ("Sender", string). The user shall not be able to enter a default value for the "Result Status" or Sender field. In the Field display section of each message editor, Name and Data Type are not editable. Data Types are typically displayed as XML types, regardless of message editor. Field names are unique per message. For the name, each message editor has a combobox containing all existing messages to enable the user to say that this message is exactly another message. Each message editor will have a rename button to the right of the combobox to allow the user to rename the currently selected message. This rename/combox will be the same whether selected from the data or business logic pages. Message names are displayed as a textbox, on both the business logic and data pages. Unique name validation will be done when the user presses the "OK" button. This editor will allow the user to specify two schemas (.XML files). The Message fields frame appears identical to the Method message editor. The names and data types are populated from the top-level XML Elements in the Internal Schema specified in the Message Schema frame. The user will be able to select from all transactions on the page. With COM and Method bindings, the fields of the messages are automatically set to either the [in] or the [out] arguments of method they are pointed to in the port. With MSMQ bindings, the user will have to go into the message editor, specify an XML schema, and select nodes in the tree to populate the fields. With CALL bindings, the user will have to go and specify the ports, messages, and transactions being passed into the called schedule.

All data types displayed on the data page will be XML data types. The Data page has one intrinsic message called the port references message that represents all of the ports on the business logic page with a field within the message. Visually, each field will have data type "port". Dynamic ports (those ports specified by the user in the wizard) will have connection points on the left. Field-to-Field connectors can terminate at these fields within the port references shape. All ports will have connection points/control handles on the right. Like any other message on the data page, there can be n number of Field-to-Field connectors starting at any field within the port references message. The port references message shall be updated each time a new port is added, deleted, or edited (name change). The shape shall add, delete or modify the appropriate field shape and its information. The user shall be able to change the relative order of the fields in the port references message for readability. The lines into and out of the port references shape will be visually different from other connectors on the data page.

Figure 21:
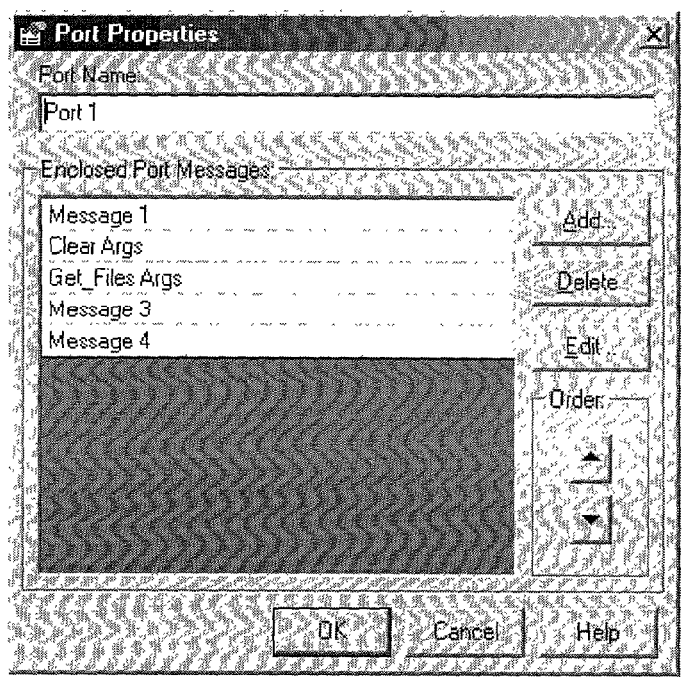
FIG. 21 illustrates an example of a (GUI) Port Properties Editor in accordance with one aspect of the present invention.

FIG. 21 illustrates an editable Port Properties (GUI) pop up screen. Each port will size itself according to the longest port message that it contains. The user shall not be able to manually change the size of a port. Each port message will be the same size. The system has two types of ports, role ports on roles and implementation ports on the separator bar. Role ports can be created by either connecting an action within an associated role to another action within a different associated role or connecting an action contained within a role to a port on the separator bar. Implementation ports can be created in three ways, first by an RMA on the separator bar "Create a new port", by deleting a role that contains role ports or by the binding wizards. Role ports can't be edited. Implementation ports can be edited to enable: changing the port name, enable the user to add port messages to the port, new and existing, to remove port messages, to visually reorder the port messages, to edit port messages or to enable port security. Unidirectional port actions can only send message to ports bound to Workflows. All future connections to that port from actions will default to send. If an existing port was specified in the binding wizard, all current connections will be changed to send (if they are not already). The binding wizard will warn the user that these changes will be made.

The business workflow process models created by the GUI scheduling software can be reduced to a programming language. The models created employing the GUI scheduling software of the present invention will now be illustrated with respect to an example of a business workflow process reduced to a scheduling programming language written in XML (hereinafter referred to as SLANG) including syntax that allows for expression of features associated with the model of the present invention. The programming language allows for users to choose between conventional features of business workflow processes and model specific features in formulating custom models for the user's particular business workflow process. The language is inherently concurrent and allows a user to specify dependency and independence between components, transaction, compensation and checkpoint boundaries, as well as mechanisms for abstracting the workflow from the implementations of the components.

Although, the present example refers to a scheduling language, it is to be appreciated that the present invention can apply to a variety of application programming languages and is not specifically limited to a scheduling language. The scheduling language provides a mechanism for describing and executing concurrent instances of components. The actions can be mapped to invocations on, for example, common object model (COM) objects, messages in queues, or other native technology behavior. The schedule easily maps onto a distributed environment due to its inherent concurrency, and can further be used to compose other schedules. A schedule can be examined at design time for deadlocks. A compiler can detect deadlock conditions between concurrent actions. A schedule can be stored on a file system, in a database, or embedded in a stream in an application. It is to be appreciated that variation of the business workflow process described herein and the programming language implementing the example would be apparent to those skilled in the art.

Figure 22:
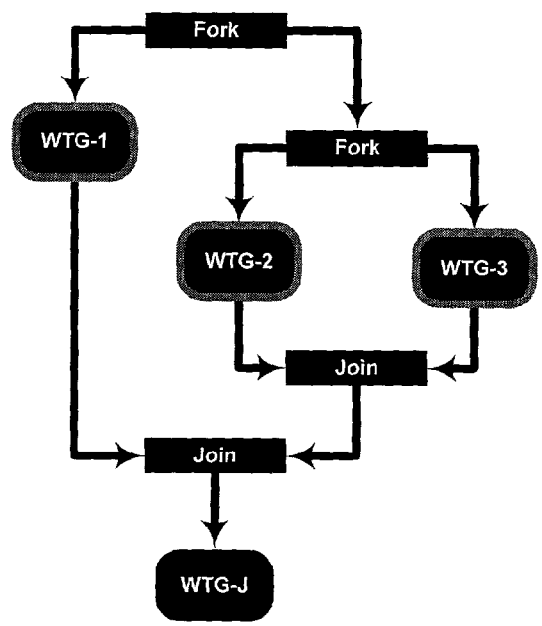
FIG. 22 illustrates an example of a simple workflow process in accordance with one aspect of the present invention.

FIG. 22 illustrates an example of a simple workflow process including action components or well terminated graphs (WTG) interconnected to one another employing fork and join components. FIG. 23 illustrates the mapping of the simple workflow process to XML tags and a simple program routine that can be compiled and executed to carry out the simple workflow process. FIG. 24 illustrates an example of an XML programming language syntax defined in Extended Backus-Naur Form (EBNF). The syntax includes schedule, ports, messages, contexts and process syntax. Each component and arrangement of components employed in the GUI scheduler program can be mapped to constructs in the XML programming language.

It is to be appreciated that the components in the GUI scheduler program can be mapped to a variety of different programming languages, such as those written in basic, C, C+ or C++. It is also to be appreciated that any programming methodology and/or computer architecture suitable for carrying out the present invention may be employed and are intended to fall within the scope of the hereto appended claims.

The invention has been described with reference to specific aspects. Obviously, modifications and alterations will occur to others upon reading and understanding the foregone detailed description. It is intended that the invention be construed as including all such modifications alterations, and equivalents thereof.

What is claimed is:

1. A workflow scheduler graphical user interface program having computer executable instructions stored on a computer-readable medium, the workflow scheduler graphical user interface program, comprising:
   code for providing a first screen area of a graphical user interface program employed by a user to create a graphical representation of a business workflow process;
   code for providing a second screen area of a graphical user interface program employed by a user to bind the graphical representation of a business workflow process to at least one technological component;
   a workflow component menu including a plurality of workflow components employed to create a business workflow process in the first screen area, the plurality of workflow components comprising at least one action component for defining actions in a business workflow process and at least one action grouping component for grouping the at least one action component, the at least one action grouping component being a role component and a transaction component;
   a separator bar separating the first screen area from the second screen area, the separator bar allows a user to drag a component from the first screen area to the second screen area to create an implementation port on the separator bar;
   at least one implementation port that couples at least one workflow component to the at least one technological component, the at least one implementation port is created on the separator bar by dragging the at least one technological component into the second screen area using a user selection device;
   at least one role port that connects an action with an associated role to an implementation port on the separator bar, wherein once an action is associated with the role, a user is prevented from dragging a role to create another role port for associating the same action to the role;
   a data flow screen that illustrates data flow between the at least one implementation port and the at least one technological component; and
   an editable transaction property screen employed to relate catch code and compensation code to the transaction component wherein compensation code is invoked on other transaction components upon a failure of a given transaction component and catch code is invoked on the failed transaction component; and
   wherein the graphical representation of the business workflow process is converted into XML code.

2. The computer-readable medium of claim 1, the plurality of workflow components comprising at least one decision component for providing decision control flow to the business workflow process.

3. The computer-readable medium of claim 2, further including an editable decision component property screen employed to add and delete rules to the decision component.

4. The computer-readable medium of claim 3, further including an editable rule property screen employed to define the rules added to the decision component.

5. The computer-readable medium of claim 1, the plurality of workflow components comprising an action component, an action grouping component, a branching component, a joining component and a decision component.

6. The computer-readable medium of claim 1, further comprising a binding component menu including a plurality of technological components employed to bind the graphical representation of the business workflow process to at least one of the plurality of technological components in the second screen area.

7. The computer-readable medium of claim 6, further comprising a message editor for each of the plurality of technological components.

8. The computer-readable medium of claim 6, the plurality of technological components comprising a component object model (COM) component, a script component, a message queue component and a schedule component.

9. The computer-readable medium of claim 1, further including an editable port references message properties screen employed to reorder implementation ports.

10. The computer-readable medium of claim 9, the editable port references message properties screen being further employed to launch an editable port properties screen, the editable port properties screen being employed to at least one of add, delete and edit port messages or arguments.

11. The computer-readable medium of claim 1, further including a binding wizard for defining the at least one technological component, the binding wizard being invoked by dragging the at least one technological component into the second screen area with a user selection device.

12. A business process scheduling program having computer executable instructions stored on a computer-readable medium, the business process scheduling program, comprising:
   a plurality of schedule tool components employed to create a representation of a business process schedule according to a set of predefined rules;

an input screen for inputting interfaces and methods of the plurality of schedule tool components;

a separator bar for separating the input screen into a first screen area and a second screen area, the separator bar allows a user to drag a schedule tool component from the first screen area to the second screen area to create an implementation port on the separator bar;

at least one implementation port that couples at least one workflow component to the schedule tool component, the at least one implementation port is created on the separator bar by dragging the schedule tool component into the second screen area using a user selection device;

at least one role port that connects an action with an associated role to an implementation port on the separator bar, wherein once an action is associated with the role, a user is prevented from dragging a role to create another role port for associating the same action to the role;

a data flow screen that illustrates data flow between the business process schedule and the plurality of schedule tool components;

a conversion component employed to convert the schedule to XML code;

wherein the plurality of schedule tool components comprises at least one action component for defining actions in a business process schedule and at least one action grouping component for grouping the at least one action component, and the action components grouped by the at least one action grouping component are selectable between an associated state and a non-associated state, the at least one action grouping component being a role component and a transaction component; and an editable transaction property screen employed to relate catch code and compensation code to the transaction component, wherein compensation code is invoked on other transaction components upon a failure of a given transaction component and catch code is invoked on the failed transaction component.

13. The computer-readable medium of claim 12, further comprising at least one binding tool component employed to bind the representation of the business process schedule to at least one technological component.

14. The computer-readable medium of claim 12, a control flow flowing to an action component grouped by an action grouping component having an associated state will automatically connect to a connection point on the action grouping component.

15. The computer-readable medium of claim 12, a control flow flowing to an action component grouped by an action grouping component having a non-associated state will allow a direct connection to a connection point on the action component.

16. The computer-readable medium of claim 12, an action grouping component having a non-associated state will not have a control handle for directing control flow and an action component having an associated state will have a control handle for directing control flow.

17. The computer-readable medium of claim 12, a connection between a first action grouping component having at least one action associated with the first action grouping component and a second action grouping component having at least one action associated with the second action grouping component will automatically generate a first grouping component port on the first action grouping component and a second grouping component port on the second action grouping component on the second action grouping component and a communicates message coupling the first grouping component port to the second grouping component port.

18. The computer-readable medium of claim 17, deletion of one of the first action grouping component and the second action grouping component creates an implementation port of the deleted action grouping component on a separator bar.

19. The computer-readable medium of claim 12, a control flow flowing from an action component grouped by an action grouping component having an associated state to an implementation port will automatically create a grouping component port on an edge of the action grouping component.

20. The computer-readable medium of claim 12, the at least one action grouping component allowing only a single control flow to flow into the at least one action grouping component.

21. The computer-readable medium of claim 20, the at least one action grouping component being a transaction component and further including at least one of a catch code and a compensation code related to the transaction component.

22. The computer-readable medium of claim 21, the transaction component being limited to two nesting levels.

23. The computer-readable medium of claim 12, the plurality of schedule tool components comprising at least one decision component having at least one non-editable rule.

24. The computer-readable medium of claim 23, the at least one decision component allowing for the addition of other rules.

25. A computer readable medium having computer-executable instructions for performing the steps comprising:

code for providing a first screen region that is employed by a user to create a representation of a business workflow process and providing a second screen region that is employed by a user to bind the business process workflow representation to a representation of at least one technological component; and displaying a separator bar between the first screen area and the second screen area, the separator bar allows a user to drag a technological component from the first screen area to the second screen area to create an implementation port on the separator bar;

displaying a workflow component menu having a plurality of workflow components employed to create a business workflow process in the first screen region, the plurality of workflow components comprising at least one action component for defining actions in a business workflow process and at least one action grouping component for grouping the at least one action component, the at least one action grouping component being a role component and a transaction component;

retrieving and displaying an implementation port image employed to bind a technological component to a component in a business workflow process in response to a user selecting one of the plurality of technological components and dragging the component into the second screen area using a user selection device;

retrieving and displaying at least one role port that connects an action with an associated role to an implementation port on the separator bar, wherein once an action is associated with the role, a user is prevented from dragging a role to create another role port for associating the same action to the role;

displaying a data flow screen that illustrates data flow between the at least one implementation port and the at least one technological component; and displaying an editable transaction property screen employed to relate catch code and compensation code to the transaction component, wherein compensation code is invoked on other transaction components upon a failure of a given transaction component and catch code is invoked on the failed transaction component; and wherein the representation of the business workflow process is converted into XML code.

26. The computer readable medium of claim 25, further including the step of retrieving and inserting an image into the first screen area of a selected one of the plurality of workflow components in response to a user selecting the component and dragging the component into the first screen area using a user selection device.

27. The computer readable medium of claim 25, further including the step of displaying an editable decision component property screen employed to add and delete rules to a decision component in response to a user selecting a decision component residing in the first screen area using a user selection device.

28. The computer readable medium of claim 27, further including the step of displaying an editable rule property screen employed to define the rules added to the decision component in response to a user selecting a button on the editable decision component property screen using a user selection device.

29. The computer readable medium of claim 25, further comprising the step of displaying a binding component menu including a plurality of technological components employed to bind the graphical representation of the business workflow process to at least one of the plurality of technological components.

30. The computer readable medium of claim 29, further including the step of displaying a message editor in response to a user selecting one of the plurality of technological components and dragging the component into the second screen area using a user selection device.

31. The computer readable medium of claim 29, further including the step of displaying a binding wizard in response to a user selecting one of the plurality of technological components and dragging the component into the second screen area using a user selection device.

32. The computer readable medium of claim 29, further including the step of displaying an editable port references message properties screen employed to reorder implementation ports.

33. The computer readable medium of claim 32, further including the step of launching an editable port properties screen, the editable port properties screen employed to at least one of add, delete and edit port messages or arguments.

34. A system comprising computer hardware for executing the following software components, the system facilitates modeling of business processes that are representable at a transaction level and an action level, the system is recorded on a computer-readable medium and capable of execution by a computer, comprising:

a graphical user interface;

a plurality of modeling components accessible through the graphical user interface and employed to create a graphical representation of a business process and a binding of the business process to at least one technological component;

at least a portion of the plurality of modeling components residing on a workflow component menu employed to create the graphical representation of a business workflow process in a first screen area;

at least a portion of the plurality of modeling components residing on a binding component menu employed to create a binding to the graphical representation of the business workflow process in a second screen area;

a separator bar separating the first screen area from the second screen area, the separator bar allows a user to drag a technological component from the first screen area to the second screen area to create an implementation port on the separator bar;

at least one implementation port coupling at least one component of the graphical representation of the business process to the technological component, the at least one implementation port is created on the separator bar by dragging the at least one technological component into the second screen area using a user selection device;

at least one role port that connects an action with an associated role to an implementation port on the separator bar, wherein once an action is associated with the role, a user is prevented from dragging a role to create another role port for associating the same action to the role;

a data flow screen illustrating data flow between the implementation port and the technological component; and wherein the graphical representation of the business workflow process is converted into XML code.

35. A graphical user interface program having computer executable instructions stored on a computer readable medium, the graphical user interface program comprising:

means for allowing a user to create a graphical representation of a business process;

means for providing an input screen for inputting interfaces and methods of at least one technological component;

means for displaying a separator bar for separating the input screen into a first screen area and a second screen area, the separator bar allows a user to drag a technological component from the first screen area to the second screen area to create an implementation port on the separator bar;

means for allowing a user to create a binding of the graphical representation of the business process to at least one technological component;

means for allowing a user to create a workflow component menu including a plurality of workflow components employed to create a business workflow process, the plurality of workflow components comprising at least one action component for defining actions in a business workflow process and at least one action grouping component for grouping the at least one action component, the at least one action grouping component being a role component and a transaction component;

means for retrieving and displaying an implementation port image employed to bind a technological component to a component in a business workflow process in response to a user selecting one of the technological components and dragging the component into the second screen area using a user selection device;

means for retrieving and displaying at least one role port that connects an action with an associated role to an implementation port on the separator bar, wherein once an action is associated with the role, a user is prevented from dragging a role to create another role port for associating the same action to the role;

means for viewing data flow between the means for coupling and the at least one technological component; and means for displaying an editable transaction property screen employed to relate catch code and compensation code to the transaction component, wherein compensation code is invoked on other transaction components upon a failure of a given transaction component and catch code is invoked on the failed transaction component; and wherein the representation of the business workflow process is converted into XML code.

* * * * *